(12) United States Patent
Kurokawa et al.

(10) Patent No.: US 10,000,858 B2
(45) Date of Patent: Jun. 19, 2018

(54) BATH FOR SURFACE TREATMENT, METHOD OF PRODUCING SURFACE-TREATED STEEL PLATE BY USING THE BATH FOR SURFACE TREATMENT, AND SURFACE TREATED STEEL PLATE PRODUCED BY THE SAME METHOD

(71) Applicants: TOYO SEIKAN GROUP HOLDINGS, LTD., Tokyo (JP); NIPPON PAINT CO., LTD., Osaka-shi, Osaka (JP); TOYO KOHAN CO., LTD., Toyko (JP)

(72) Inventors: Wataru Kurokawa, Yokohama (JP); Seitaro Kanazawa, Yokohama (JP); Shinichi Taya, Kudamatsu (JP); Kunihiro Yoshimura, Kudamatsu (JP); Naomi Iida, Kudamatsu (JP); Miwa Iida, Tokyo (JP); Masahiko Matsukawa, Tokyo (JP)

(73) Assignees: TOYO SEIKAN GROUP HOLDINGS, LTD., Tokyo (JP); NIPPON PAINT SURF CHEMICALS CO., LTD., Tokyo (JP); TOYO KOHAN CO., LTD., Tokyo (JP)

(*) Notice: Subject to any disclaimer, the term of this patent is extended or adjusted under 35 U.S.C. 154(b) by 983 days.

(21) Appl. No.: 14/339,231

(22) Filed: Jul. 23, 2014

(65) Prior Publication Data
US 2014/0332397 A1 Nov. 13, 2014

Related U.S. Application Data

(62) Division of application No. 13/695,511, filed as application No. PCT/JP2011/062192 on May 27, 2011, now Pat. No. 8,822,037.

(30) Foreign Application Priority Data

May 28, 2010 (JP) .................................. 2010-123007

(51) Int. Cl.
*C25D 3/56* (2006.01)
*C25D 3/60* (2006.01)
(Continued)

(52) U.S. Cl.
CPC ................ *C25D 3/32* (2013.01); *B32B 15/04* (2013.01); *B32B 15/08* (2013.01); *B32B 15/082* (2013.01);
(Continued)

(58) Field of Classification Search
CPC ............... C25D 3/32; C25D 3/54; C25D 3/56
(Continued)

(56) References Cited

U.S. PATENT DOCUMENTS 5,451,323 A 9/1995 Akao et al.
5,510,014 A 4/1996 Murayama
(Continued)

FOREIGN PATENT DOCUMENTS

EP 1780312 A1 5/2007
EP 2159045 A1 * 3/2010 ............. B32B 15/08
(Continued)

OTHER PUBLICATIONS

Communication dated Mar. 11, 2016 from the European Patent Office in counterpart application No. 11786744.0.

*Primary Examiner* — Edna Wong
(74) *Attorney, Agent, or Firm* — Sughrue Mion, PLLC

(57) ABSTRACT

To provide a bath for surface treatment capable of forming a surface-treating film having excellent corrosion resistance by a high-speed electrolytic treatment, and a method of producing a surface-treated steel plate having excellent
(Continued)

corrosion resistance and closely adhering property to the coating maintaining good productivity. A bath for surface treatment used for forming a surface-treating film on the surface of a steel plate by cathodic electrolysis, the bath for surface treatment containing Zr and/or Ti, and a polycarboxylic acid.

4 Claims, 4 Drawing Sheets

(51) Int. Cl.
    *C25D 3/00* (2006.01)
    *C25D 3/32* (2006.01)
    *C25D 9/10* (2006.01)
    *B32B 15/04* (2006.01)
    *B32B 15/08* (2006.01)
    *B32B 15/082* (2006.01)
    *C25D 21/14* (2006.01)
    *C25D 21/18* (2006.01)
    *C25D 5/50* (2006.01)

(52) U.S. Cl.
    CPC ............... *C25D 9/10* (2013.01); *C25D 21/14* (2013.01); *C25D 21/18* (2013.01); *B32B 2439/40* (2013.01); *C25D 5/505* (2013.01); *Y10T 428/1259* (2015.01); *Y10T 428/12569* (2015.01); *Y10T 428/12618* (2015.01); *Y10T 428/12722* (2015.01); *Y10T 428/12806* (2015.01); *Y10T 428/12972* (2015.01)

(58) Field of Classification Search
    USPC ........................................ 205/238, 253, 261
    See application file for complete search history.

(56) References Cited

U.S. PATENT DOCUMENTS

| | | |
|---|---|---|
| 7,531,051 B2 | 5/2009 | Nakayama et al. |
| 7,749,582 B2 | 7/2010 | Kurokawa et al. |
| 7,938,950 B2 | 5/2011 | Kurokawa et al. |
| 2005/0067056 A1* | 3/2005 | Shoji ....................... C23C 22/34 148/273 |
| 2006/0185769 A1 | 8/2006 | Nakayama et al. |
| 2009/0142589 A1* | 6/2009 | Shoji ....................... B32B 15/08 428/336 |
| 2011/0076505 A1 | 3/2011 | Ishii et al. |

FOREIGN PATENT DOCUMENTS

| | | | |
|---|---|---|---|
| EP | 2159045 A1 | 3/2010 | |
| JP | 62-161986 A | 7/1987 | |
| JP | 3-232999 A | 10/1991 | |
| JP | 5-71000 A | 3/1993 | |
| JP | 7-3500 A | 1/1995 | |
| JP | 8-74097 A | 3/1996 | |
| JP | 9-176899 A | 7/1997 | |
| JP | 2003-253498 A | 9/2003 | |
| JP | 2004-190121 A | 7/2004 | |
| JP | 2005-97712 A | 4/2005 | |
| JP | 2006-348360 A | 12/2006 | |
| JP | 2008-297595 A | 12/2008 | |
| JP | 2010-13728 A | 1/2010 | |
| JP | 2010013728 A * | 1/2010 | ............... C25D 9/10 |
| WO | 02/103080 A1 | 12/2002 | |
| WO | 2007/061011 A1 | 5/2007 | |

\* cited by examiner

BATH FOR SURFACE TREATMENT, METHOD OF PRODUCING SURFACE-TREATED STEEL PLATE BY USING THE BATH FOR SURFACE TREATMENT, AND SURFACE TREATED STEEL PLATE PRODUCED BY THE SAME METHOD

CROSS-REFERENCE TO RELATED APPLICATIONS

This is a Divisional of U.S. application Ser. No. 13/695,511 filed Oct. 31, 2012, which is a National Stage Entry of PCT International Application No. PCT/JP2011/062192 filed May 27, 2011, which claims benefit of Japanese Patent Application No. 2010-123007 filed May 28, 2010. The above-noted applications are incorporated herein by reference in their entirety.

TECHNICAL FIELD

This invention relates to a bath for surface treatment for producing a surface-treated steel plate, and to a method of producing the surface-treated steel plate by using the bath for surface treatment. More specifically, the invention relates to a chromium-free bath for surface treatment featuring excellent bath stability and capable of treating, at a high speed, the surfaces of a steel plate to impart excellent corrosion resistance and closely adhering property to the coating so as to exhibit excellent adhesion during the working even when the steel plate is being severely worked, to a method of producing the surface-treated steel plate, to the surface-treated steel plate, to the surface-treated steel plate having an organic coating, to a can body and to a can lid.

BACKGROUND ART

A chromate treatment has heretofore been known for improving close adhesion between a steel plate and an organic coating. Owing to its excellent corrosion resistance and close adhesion, therefore, the chromate treatment has been widely employed in the fields of domestic electric appliances, building materials, vehicles, aircraft, containers and the like.

If roughly classified from the standpoint of the treating method, the chromate treatments can be divided into those of the chemical conversion type (reaction type coating type) and those of the electrolysis type. If roughly classified from the standpoint of the formed films, the chromate treatments can be divided into those of the type in which hexavalent chromium remains in trace amounts in the final product to utilize the self-repairing effect to a large extent and those of the type in which no hexavalent chromium remains in the final product. Those of the type in which hexavalent chromium remains in trace amounts in the final product have now been blamed for their probability of permitting hexavalent chromium to elute out into the environment such as soil when they are disposed of. It is, therefore, a trend chiefly in European countries to abolish the use of the chromate treatment. Besides, in the chromate treatment of any type, hexavalent chromium is contained in the treatment liquid accompanied, therefore, by various problems from the standpoint of environment. Namely, it is essential to completely treat waste water and waste gases stemming from the hexavalent chromium-containing treating solution so that they are not drained to the exterior requiring, therefore, a huge sum of cost for the facilities for treating waste water and waste gases, and for the disposal is necessary. Besides, ever strict regulations have been imposed on transporting the sludge after having treated the waste water and on discharging the gases thereof. Therefore, it has been desired to develop a chromium-free surface treatment comparable to the conventional chromate treatment.

A metal material for metal containers has been treated with chromate in a manner that no hexavalent chromium finally remains, as a matter of course, and, besides, the metal material has, usually, been coated with an organic resin. For example, attempts have been made to cathodically electrolyze a tin-plated steel plate in an aqueous solution of sodium bichromate, to cathodically electrolyze the steel plate in an aqueous solution of a fluoride-containing anhydrous chromate, or to treat an aluminum alloy with chromic phosphate followed by coating with an organic resin.

To treat the surfaces of the steel plate without using chromium, a dip treatment has been proposed by using a treating solution containing Zr (zirconium) or Ti (titanium) (patent document 1).

However, the film on the surface-treated steel plate treated with Zr or Ti by dip treatment has poor corrosion resistance and deposits at a rate lower than that of the electrolytic chromate-treated steel plate (TFS) that has heretofore been used as a material for cans, and is, therefore, produced very inefficiently.

Therefore, treatments with Zr and/or Ti based on the cathodic electrolysis have been proposed as a high-speed treatment process to substitute for the dip treatment (patent documents 2 and 3).

PRIOR ART DOCUMENTS

Patent Documents

Patent document 1: International Publication WO2002/103080
Patent document 2: JP-A-2004-190121
Patent document 3: JP-A-2005-97712

OUTLINE OF THE INVENTION

Problems that the Invention is to Solve

As described above, the surface-treated steel plate having a Zr- and/or Ti-containing film used as a material for cans, too, must have its film formed by the cathodic electrolytic treatment capable of executing a high-speed treatment in order to realize productivity which is comparable to the TFS surface treatment. In conducting the cathodic electrolytic treatment in a bath for treatment containing Zr and/or Ti as main components, even if it is attempted to increase the rate of depositing the film by increasing the current density in order to improve productivity, however, the amount of film does not increase in proportion to the quantity of electricity, and it is difficult to satisfy the requirement of high-speed treatment.

Besides, as the metal ions of Fe and/or Sn elute out in increased amounts in the bath for treatment from a steel plate which is the base material or from a steel plate plated with tin, the corrosion resistance of the formed film tends to decrease. Therefore, the metal ions must be removed by elevating the pH of the bath for treatment. In this case, however, Zr and/or Ti which are the components forming the film precipitate, too, making it difficult to efficiently remove the metal ions eluted out into the bath for treatment from the base material.

It is, therefore, an object of the present invention is to provide a chromium-free bath for surface treatment containing Zr and/or Ti as main components for treating the surfaces of the steel plate by the cathodic electrolysis, featuring a high-speed treatment and excellent bath stability.

Another object of the invention is to provide a method of producing a surface-treated steel plate by using the bath for treatment maintaining good productivity.

A further object of the invention is to provide a surface-treated steel plate having excellent properties such as corrosion resistance, closely adhering property to the film and, specifically, close adhesion during the working of when the steel plate is subjected to severe working, and a surface-treated steel plate having an organic coating obtained by forming an organic coating on the surface-treated steel plate.

A still further object of the invention is to provide a can body and a can lid made from the above surface-treated steel plate having organic coating, and featuring excellent corrosion resistance, corrosion resistance after the retort sterilization treatment and dent resistance.

Means for Solving the Problems

According to the present invention, there is provided a bath for surface treatment used for forming a surface-treating film on surfaces of a steel plate by cathodic electrolysis, the bath for surface treatment containing Zr and/or Ti, and a polycarboxylic acid.

In the bath for surface treatment of the invention, it is desired that:
1. The polycarboxylic acid is a homopolymer selected from polyacrylic acid, polymethacrylic acid, polymaleic acid or polyitaconic acid, or a copolymer of at least any one of them as a constituent unit;
2. The concentration of Zr and/or Ti is in a range of from 1,000 to 10,000 ppm, the concentration of the polycarboxylic acid is in a range of from 0.01 to 1.0 times as great as the concentration of Zr and/or Ti, and the concentration of Fe ions is not more than 500 ppm;
3. A tin-plated layer is formed on the surface of the steel plate and, in this case, the concentration of Zr and/or Ti is in a range of from 1,000 to 10,000 ppm, the concentration of the polycarboxylic acid is in a range of from 0.01 to 1.0 times as great as the concentration of Zr and/or Ti, and the total concentration of Sn ions and Fe ions is not more than 500 ppm; and
4. The electric conductivity is in a range of from 10 to 50 mS/cm.

According to the invention, further, there is provided a method of producing a surface-treated steel plate by forming a surface-treating film on a steel plate by conducting the cathodic electrolysis in the bath for surface treatment, wherein the rate of deposition of Zr and/or Ti per a second of current flowing time is not less than 80 mg/m$^2$/sec.

In the method of producing a surface-treated steel plate of the invention, it is desired that:
1. The pH of the treating solution in the bath for treatment is elevated to precipitate and remove an iron polycarboxylate therefrom followed by returning the pH back and, thereafter, the polycarboxylic acid is added so that the concentration of the polycarboxylic acid in the bath for treatment lies in a range of from 0.01 to 1.0 times as great as the concentration of Zr and/or Ti and, specifically, the concentration of Fe ions in the bath for treatment is adjusted to be not more than 500 ppm; and
2. A tin-plated layer is formed on the surface of the steel plate, the precipitate, further, includes a tin polycarboxylate and, specifically, the total concentration of Sn ions and Fe ions in the bath for treatment is adjusted to be not more than 500 ppm.

According to the invention, further, there is provided a surface-treated steel plate obtained by forming, on at least one surface of the steel plate by cathodic electrolysis, a surface-treating film which contains a mixed oxide of an oxide of Fe and an oxide of Zr and/or Ti, and a polycarboxylic acid, the amount of Zr and/or Ti being from 3 to 300 mg/m$^2$ and the amount of C (carbon) being from 0.1 to 5.0 mg/m$^2$.

In the surface-treated steel plate of the invention, it is desired that:
1. The atomic ratio represented by Fe/(Zr and/or Ti) in the surface-treating film is not more than 1.0; and
2. A tin-plated layer is formed on the surface of the steel plate, and the atomic ratio represented by (Fe and Sn)/(Zr and/or Ti) in the surface-treating film is not more than 1.0.

According to the invention, further, there is provided a surface-treated steel plate having an organic coating obtained by forming an organic coating on at least one surface of the surface-treated steel plate.

In the surface-treated steel plate having the organic coating of the invention, the organic coating desirably comprises a thermoplastic resin.

According to the invention, further, there is provided a can body obtained by forming from the above surface-treated steel plate having the organic coating.

It is desired that the can body of the invention is a seamless can obtained by draw•bend-elongating and/or ironing the surface-treated steel plate having the organic coating.

According to the invention, further, there is provided a can lid obtained by forming from the surface-treated steel plate having the organic coating.

Effects of the Invention

According to the present invention, a polycarboxylic acid is contained in a bath for treatment. Therefore, Fe ions (as well as Sn ions if the steel plate has a tin-plated layer) eluted out in the bath for treatment from the steel plate are trapped by the polycarboxylic acid, and the concentration of Fe ions (as well as the concentration of Sn ions if the steel plate has the tin-plated layer) in the bath for treatment is maintained to be not more than a predetermined value, making it possible to form a film having excellent corrosion resistance.

Further, the polycarboxylic acid used in the invention traps Fe ions and Sn ions among the Fe ions (and Sn ions if the steel plate has the tin-plated layer), Zr and/or Ti, but does not almost trap Zr and Ti without, therefore, affecting the Zr concentration and Ti concentration in the bath for treatment and making it possible to maintain a stable bath for treatment.

Further, the bath for treatment of the invention contains Zr and/or Ti as main constituent components, and therefore is capable of maintaining a stable surface by holding the state of the outermost surface of the film even in a high temperature and high humidity environment. Therefore, although the bath for treatment of the invention is a chromium-free, the bath makes it possible to maintain corrosion resistance and to suppress a decrease in the close adhesion or adhering property to the organic coating.

In the method of producing the surface-treated steel plate of the invention which uses the above-mentioned bath for treatment, a high-speed treatment can be conducted maintaining the rate of precipitation of Zr and/or Ti of not less than 80 mg/m$^2$/sec per a second of current flowing time, and the surface-treated steel plate can be produced maintaining good productivity and featuring excellent corrosion resistance and close adhesion to the coating.

Besides, upon regenerating the bath for treatment in a separate vessel or in a circulation passage, the concentration of Fe ions (total concentration of Sn ions and Fe ions if the steel plate has a tin-plated layer) in the bath for treating can be maintained to be not more than 500 ppm, and the surface-treated steel plate having excellent corrosion resistance can be efficiently produced.

Further, the surface-treated steel plate having an organic coating of the invention excels in close adhesion to the organic coating and in the adhesion during the working even when it is put to a severe working.

Moreover, the can body and the can lid made from the surface-treated steel plate having the organic coating of the invention, excel in corrosion resistance and, specifically, in corrosion resistance after the retort sterilization and in dent resistance, the can lid, further, featuring excellent openability.

The above effects of the invention will also become obvious from the results of Examples appearing later.

Namely, as will be obvious from Table 3, with any treating solution containing the polycarboxylic acid (polyitaconic acid), the precipitation takes place at a pH 3.0 (Examples 1 to 4). In Comparative Example 1 using a bath (J) for treatment without blended with the polycarboxylic acid, however, no precipitation takes place. It is, therefore, obvious that the polycarboxylic acid (polyitaconic acid) induces precipitation, and the Fe ionic component can be removed from the first stage at a pH close to the treating condition. Upon further elevating the pH (pH 3.5), the height of precipitation further increases than when pH is 3.0, and it is learned that the Fe ionic component can be effectively removed (Examples 5 to 8).

Though the amounts of Fe precipitation are nearly of the same level in Comparative Example 2 containing no polycarboxylic acid and in Examples 5 to 8, it will be learned that the height of the whole precipitation increases with an increase in the amount of the polycarboxylic acid (polyitaconic acid) enabling Fe ions to be easily removed. Further, if the pH is maintained at 2.5, Fe dissolves in an increased amount as compared to when the pH is adjusted to be 3.0. As demonstrated in Examples 11 to 16, however, the height of precipitation increases with an increase in the amount of the polycarboxylic acid (polyitaconic acid), and Fe precipitates in amounts larger than those of Comparative Examples 5 to 7.

When a polyacrylic acid is used as the polycarboxylic acid, too, the Fe ionic component can be effectively removed (Example 17). When an Sn ionic component is present instead of the Fe ionic component, too, the Sn ionic component can be effectively removed (Examples 18 and 19).

Upon selecting the pH and the amount of the polycarboxylic acid in the bath for treatment as described above, the Fe ions and Sn ions dissolved in the bath for treatment can be precipitated and removed by elevating the pH by the least amount even when the Fe ions and Sn ions are to be removed in separate vessels. As compared to when no polycarboxylic acid is contained, further, Fe and Sn so easily precipitate that there is no need of greatly elevating the pH. If the operation for returning the pH back is taken into account, ions for adjusting the pH, such as acid component of nitric acid or sulfuric acid or alkali component of sodium hydroxide or ammonia, are prevented from entering into the bath for treatment and, besides, the treatment can be conducted with the Fe ions being dissolved in a smaller amount in the bath for treatment. When the Fe ions are to be removed in a circulation passage, on the other hand, the Fe ions dissolved in an amount larger than a predetermined amount can be continuously removed by using a filter upon selecting the pH and the amount of the polycarboxylic acid in the bath for treatment, and the treatment can be efficiently conducted.

As is obvious from Table 6, further, the concentration of Zr is not almost varying before and after the removal of the precipitate. Namely, the Zr component is not almost affected by the regeneration treatment, and the concentration of Fe ions and the concentration of the polycarboxylic acid (hereinafter often described as PC concentration) only are decreasing. After the precipitate has been removed, further, the cross-cut corrosion resistance is improving from which it is learned that the properties of the surface-treated steel plate can be improved by using the bath for treatment from which the precipitate has been removed.

As will be obvious from Table 8, further, the surface-treated steel plates of which the amount of Zr is from 3 to 300 mg/m$^2$ and the amount of C is from 0.1 to 5.0 mg/m$^2$ as obtained by the cathodic electrolytic treatment are not almost corroded when they are cross-cut-dipped, and all possessed excellent corrosion resistance (Examples 71 to 92). On the other hand, the surface-treated plate obtained only by the dipping without conducting the cathodic electrolytic treatment as in Comparative Example 21 exhibits poor cross-cut corrosion resistance. In Comparative Examples 19 and 20 in which no polycarboxylic acid is contained in the bath for treatment, the surface-treated plates exhibit poor cross-cut corrosion resistance despite they are obtained through the cathodic electrolytic treatment.

Here, despite the cathodic electrolytic treatment is conducted by using the bath for treatment containing the polycarboxylic acid, the cross-cut corrosion resistance becomes slightly poor if the amount of C is less than 0.1 mg/m$^2$ or is more than 5.0 mg/m$^2$, or if the amount of Zr is less than 3 mg/m$^2$. The surface-treated steel plate of which the amount of Zr is more than 300 mg/m$^2$ has favorable cross-cut corrosion resistance, but the effect of improving the cross-cut corrosion resistance is small and is not advantageous in economy. It is, therefore, desired that the amount of Zr does not exceed 300 mg/m$^2$.

It will be, further, obvious from Examples 93 to 95 shown in Table 9 that by using tin-plated steel plates obtained by forming a tin-plated layer as the steel plates, excellent corrosion resistance is obtained despite the amount of the Zr film is relatively small. It will be, further, learned that the strength of adhesion increases with an increase in the amount of Zr.

As will be obvious from Tables 10 and 11, further, the cans made from the surface-treated steel plates having the organic coating of the invention feature favorable cross-cut corrosion resistance, adhesion during the working, adhesion after the retort treatment, and evaluation of cans after filled with contents (pack test (dent resistance)), and have properties comparable to those of the cans made from a surface-treated steel plate such as TFS or tin plate which contains chromium (Comparative Examples 24 to 30).

Figure 1:
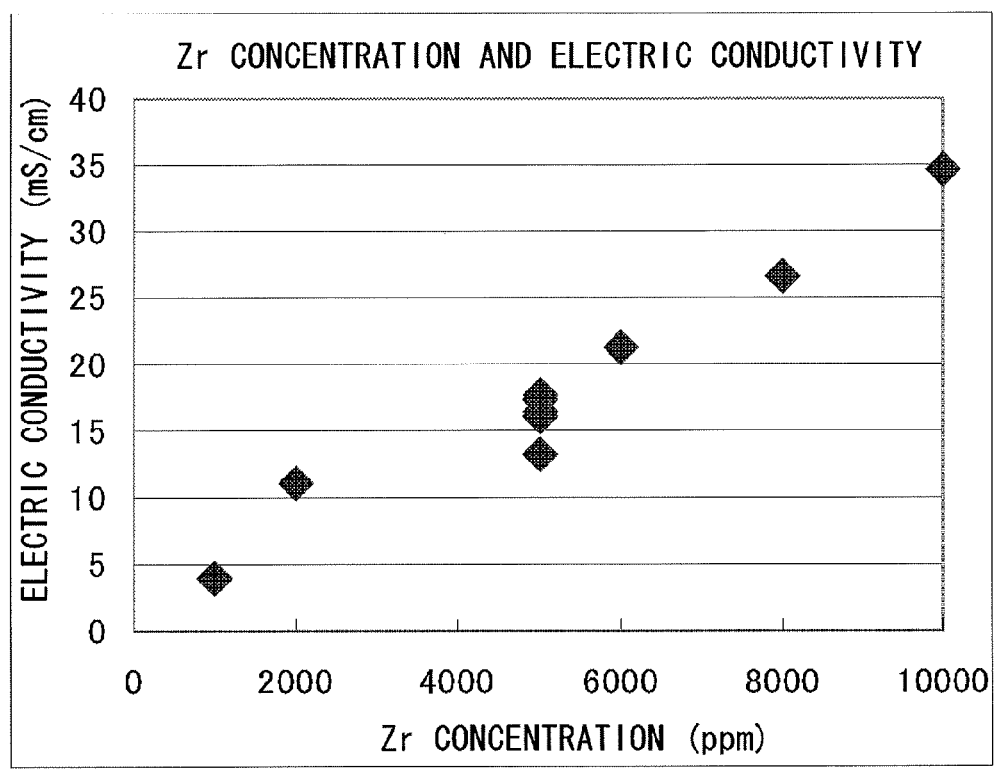
FIG. 1 is a diagram showing a relationship between the Zr concentration and the electric conductivity.

MODES FOR CARRYING OUT THE INVENTION (Steel Plates)

As the steel plate for use in the invention, there can be used a known cold-rolled steel plate and a steel tape (coil) that have heretofore been used for making cans. When used for making cans, it is desired that the thickness of the plate is from about 0.07 to about 0.4 mm.

In the invention, a surface-treating film is directly formed on the surface of the cold-rolled steel plate by using the bath for surface treatment of the invention. However, the surface of the steel plate may have been plated with tin. In this case, the surface-treating film is formed on the tin-plated layer. In this specification, "a tin-plated steel plate" having a tin-plated layer formed on the surface thereof, too, is often referred to simply as "steel plate".

Though not limited thereto only, the tin-plated layer is desirably so formed on the surface of the steel plate that the amount of tin is from 0.6 to 11.2 $g/m^2$ and, specifically, from 0.8 to 5.6 $g/m^2$. The tin-plated layer formed in an amount in the above range works to improve the corrosion resistance of the steel plate itself and, when combined with the surface-treating layer formed by using the bath for surface treatment of the present invention, makes it possible to improve the adhesion to the thermoplastic resin coating during the working, close adhesion after the retort-treatment and corrosion resistance.

By changing part of the tin-plated layer, which is formed on the steel plate, on the side of the steel plate into a tin-iron alloy, it is made possible to form a two-layer constitution of tin-plated layer/tin-iron alloy layer. Or the tin-iron alloy layer may be formed on the whole surface of the steel plate.

To form the tin-plated layer in the two-layer constitution of tin-plated layer/tin-iron alloy layer, the steel plate is plated with tin in a predetermined amount and is, thereafter, heated to be not lower than the melting point of tin followed by cooling (reflow treatment) to thereby change part of the tin-plated layer on the side of the steel plate into the tin-iron alloy layer. It is desired that the alloy is formed to a degree of 5 to 60% in the amount of tin contained in the tin-plated layer and, specifically, that free tin is left in an amount of not less than 0.1 $g/m^2$ therein from the standpoint of weldability.

By forming the two-layer structure of free tin layer and tin-iron alloy layer as described above, the adhesion during the working can be improved yet maintaining weldability and, besides, the corrosion resistance of the steel plate itself can be improved.

(Baths for Surface Treatment)

The present invention has an important feature in that the bath for surface treatment is a chromium-free bath for treatment containing Zr and/or Ti, and a polycarboxylic acid. The polycarboxylic acid contained in the bath for treatment traps Fe ions and Sn ions eluted out in the bath for treatment from the steel plate or from the tin-plated layer, but does not almost trap Zr or Ti. It is, therefore, made possible to maintain the concentrations of Fe ions and Sn ions to be not more than predetermined values without decreasing the concentrations of Zr and/or Ti in the bath for treatment.

Namely, the polycarboxylic acid forms a chelate with Fe ions and/or Sn ions suppressing Fe ions and/or Sn ions from excessively contained in the film. Besides, the polycarboxylic acid partly turns into a film-constituting component in a state of chelating the Fe ions, and contributes to improving close adhesion to the organic coating.

In the invention, especially when the surface treatment is conducted by a high-speed electrolysis (0.05 to 0.60 seconds), it is desired to set the concentration of Zr and/or Ti in the bath for treatment to lie in a range of from 1,000 to 10,000 ppm and, specifically, from 3,000 to 6,000 ppm. If the concentration of Zr and/or Ti is larger than the above range, the corrosion resistance of the film that is formed may become lower than that of when the concentration of Zr and/or Ti is in the above range. If the concentration of Zr and/or Ti is lower than the above range, on the other hand, high-speed deposition may not be attained. In this application, the concentration of Zr and/or Ti stands for the concentration of either Zr or Ti if either one of them only is present in the bath for treatment, and stands for the total concentration of Zr and Ti if both of them are present in the bath. The Zr concentration and the Ti concentration in the bath for treatment can be measured by using an ICP emission spectrometer (e.g., CIROS manufactured by Rigaku Corporation).

To attain the high-speed treatment, it is desired that the electric conductivity of the bath for treatment is in a range of from 10 to 50 mS/cm and, specifically, 15 to 25 mS/cm in addition to that the concentration of Zr and/or Ti is in the above range. If the electric conductivity is lower than the above range, the current efficiency becomes poor and, therefore, the film cannot be formed in a short period of time. If the electric conductivity is higher than the above range, on the other hand, an excess of electrolyte is formed to adversely affect the corrosion resistance.

Figure 2:
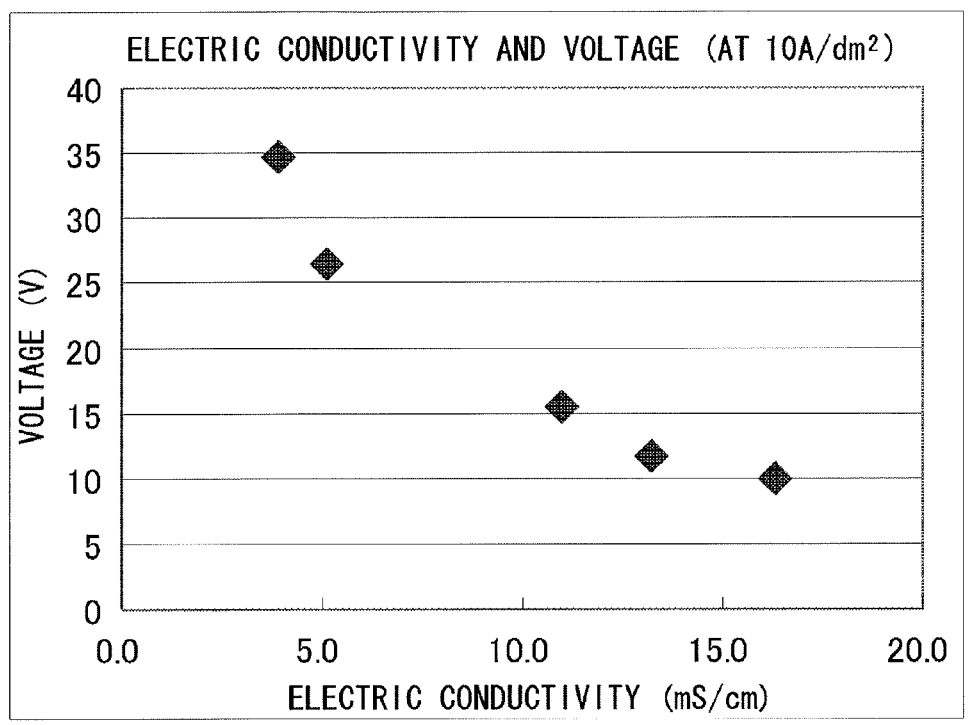
FIG. 2 is a diagram showing a relationship between the electric conductivity and the voltage.
Figure 3:
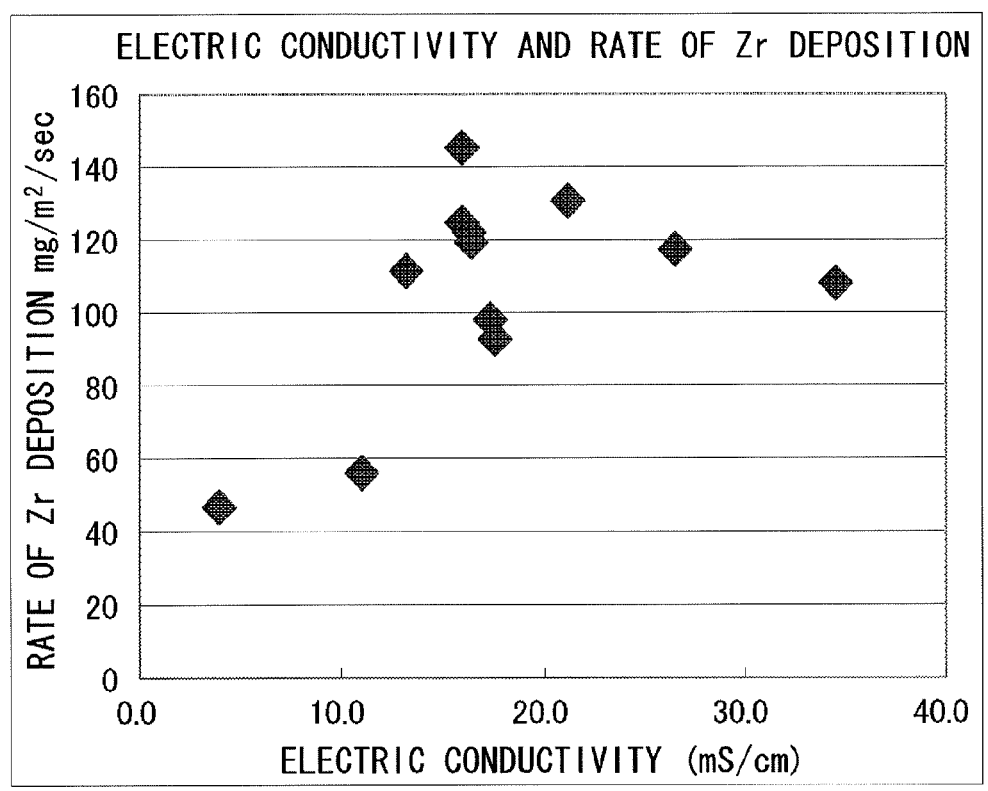
FIG. 3 is a diagram showing electric conductivity and the rate of Zr deposition.

FIGS. 1 to 3 are respectively showing a relationship between the Zr concentration and the electric conductivity (FIG. 1), a relationship between the electric conductivity and the voltage (FIG. 2), and a relationship between the electric conductivity and the rate of Zr deposition (FIG. 3) found from the results of Examples appearing later. As will be obvious from FIGS. 1 to 3, the electric conductivity of the bath for treatment increases with an increase in the Zr concentration (FIG. 1), and the voltage of the bath for treatment becomes low (FIG. 2). However, the rate of Zr deposition does not necessarily increase with an increase in the electric conductivity. The rate of deposition becomes the greatest near 15 to 25 mS/cm (FIG. 3). It is, further, desired that the voltage of the rectifier at the time of electrolysis is not higher than 20 V from the standpoint of energy requirement and cost of rectifier facilities. Usually, it is desired that the electric conductivity of the bath for treatment is high. Here, however, the electric conductivity is subject to vary depending upon the concentration of Zr and/or Ti as well as upon the acid components and alkali components that are added for adjusting the Fe ion concentration and the pH. Therefore, the electric conductivity can be elevated by adding, to the bath for treatment, ions other than Zr and Ti which are the chief components of the film. From the standpoint of corrosion resistance of the treating film, however, it is not desired to add ions other than Zr or Ti to an excess degree.

It is desired that the concentration of polycarboxylic acid (PC concentration) in the bath for treatment is in a range of from 0.01 to 1.0 and, specifically, from 0.02 to 0.2 as expressed by a concentration ratio (PC/(Zr and/or Ti)) to the concentration of Zr and/or Ti. The concentration of polycarboxylic acid in the bath for treatment can be found by being calculated as a polycarboxylic acid concentration by multiplying, by a predetermined coefficient, a concentration of an organic carbon that is measured by using a total organic carbon meter (e.g., TOC-5000 manufactured by Shimadzu Corporation).

Namely, as described above, the polycarboxylic acid forms a chelate with Fe ions and/or Sn ions, suppressing Fe ions and/or Sn ions from excessively contained in the film, and partly turns into a film-constituent component in a state of chelating Fe ions and/or Sn ions. Here, if the ratio of the polycarboxylic acid concentration is higher than the above range, the polycarboxylic acid is contained too much in the film irrespective of the Fe ions and/or the Sn ions causing the corrosion resistance to decrease, and too much polycarboxylic acid is not desirable in economy, either. If the ratio of the polycarboxylic acid concentration is lower than the above range, on the other hand, the Fe ions and Sn ions in the bath for treatment are not trapped to a sufficient degree, and the corrosion resistance decreases.

The concentration of polycarboxylic acid is found by being calculated from the concentration of the organic carbon as described in Examples appearing later.

The bath for treatment contains Fe ions eluted out from the steel plate, or contains Sn ions or Sn ions and Fe ions when the steel plate has been plated with tin. As described above, however, if these metals are present in large amounts in the bath for treatment, the corrosion resistance of the formed film decreases. According to the present invention, therefore, it is desired that the concentration of Fe ions in the bath for treatment, or the total concentration of Sn ions and Fe ions in the case of the tin-plated steel plate, is maintained to be not more than 500 ppm and, specifically, not more than 300 ppm.

In this specification, "the total concentration of Sn ions and Fe ions" stands for a total concentration of Sn ions and Fe ions eluted out from the tin-plated steel plate, which, however, also includes a case where no Fe ion is present but Sn ions only are present, as a matter of course.

It is desired that the bath for treatment of the invention comprises an aqueous solution of a pH of from 2.0 to 6.0 and, more preferably, from 2.5 to 4.5. If the pH is lower than the above range, the etching becomes excessive, and the Fe ion concentration and the Sn ion concentration increase in the bath for treatment. If the pH is higher than the above range, on the other hand, the etching becomes insufficient, and the film cannot be efficiently formed and the bath for treatment loses stability.

As the Zr agent for supplying Zr component, there can be used potassium zirconium fluoride $K_2ZrF_6$, ammonium zirconium fluoride $(NH_4)_2ZrF_6$, ammonium zirconium carbonate solution $(NH_4)_2ZrO(CO_3)_2$, zirconium oxynitrate $ZrO(NO_3)_2$, and zirconium oxyacetate $ZrO(CH_3COO)_2$. As the Ti agent for supplying Ti component, there can be used potassium titanium fluoride $K_2TiF_6$, ammonium titanium fluoride $(NH_4)_2TiF_6$, sodium titanium fluoride $Na_2TiF_6$, potassium titanium oxalate dihydrate $K_2TiO(C_2O_4)_2 \cdot 2H_2O$, titanium chloride (III) solution $TiCl_3$, and titanium chloride (IV) solution $TiCl_4$. As the F agent, there can be used sodium fluoride NaF, potassium fluoride KF and ammonium fluoride $NH_4F$.

As the polycarboxylic acid to be added to the bath for treatment, there can be exemplified a homopolymer selected from polyacrylic acid, polymethacrylic acid, polymaleic acid and polyitaconic acid, or a copolymer that uses at least one of them as a constituent unit. Among them, polyitaconic acid can be particularly preferably used.

As the copolymer, there can be exemplified polyitaconic acid/polymaleic acid copolymer and polyitaconic acid/(meth)acrylic acid copolymer. It is, further, allowable to use an alkali metal salt or an ammonium salt of the polycarboxylic acid.

It is also allowable, without impairing the above functions of the polycarboxylic acid, to use a copolymer of other monomers or modified products thereof. As the other monomers, there can be exemplified the following compounds.

Namely, vinyl compounds such as N-vinylpyrrolidone, N-vinylcarbazole, N-vinyloxazoline, N-vinyl-1,2,4-triazole, N-vinylphthalimide, N-vinylsuccinimide, N-vinylimidazole, vinylsulfonic acid, 2-sulfoethyl (meth)acrylate and vinylphosphonic acid; epoxides such as ethylene oxide, propione oxide, butylglycidyl ether, phenylglycidyl ether, ethylene glycol digrycidyl ether, and polyethylene glycol diglycidyl ether; vinyl ketones such as methyl vinyl ketone, phenyl vinyl ketone and divinyl ketone; acrylic amide monomers such as (meth)acrylamide, N-methylol(meth)acrylamide, N,N-dimethyl(meth)acrylamide, N,N-dibutyl (meth)acrylamide, N,N-dioctyl(meth)acrylamide, N-monobutyl(meth)acrylamide, N-monooctyl(meth)acrylamide, N-isopropylacrylamide, acryloylmorpholine, N,N-dimethylaminopropylacrylamide, diacetonacrylamide, N-2-hydroxyethylacrlamide, and 2-acrylamide-2-methyl sulfonic acid; (meth)acrylate ester monomers such as methyl (meth)acrylate, ethyl (meth)acrylate, n-butyl (meth)acrylate, isobutyl acrylate, t-butyl (meth)acrylate, 2-ethylhexyl (meth)acrylate, lauryl methacrylate, phenyl acrylate, isobornyl (meth)acrylate, cyclohexyl methacrylate, t-butylcyclohexyl (meth)acrylate, dicyclopentadienyl (meth)acrylate, dihydrodicyclopentadienyl (meth)acrylate, N,N-dimethylaminoethyl acrylate, 2-methacryloyloxyethylsuccinic acid, ethylene glycol dimethacrylate, glycerine dimethacrylate, methoxytriethylene glycol, 2-hydroxyethyl (meth)acrylate, 2-hydroxypropyl (meth)acrylate, 4-hydroxybutyl (meth)acrylate, methoxypolyethylene glycol methacrylate, and methoxypolyethylene glycol dimethacrylate; polymerizable nitriles such as acrylonitrile and methacrylonitrile; alkyl vinyl ethers such as methyl vinyl ether, ethyl vinyl ether, n-propyl vinyl ether, isopropyl vinyl ether, n-butyl vinyl ether, isobutyl vinyl ether, and t-butyl vinyl ether; polymerizable aromatic compounds such as styrene, α-methylstyrene, t-butylstyrene, parachlorostyrene, vinylnaphthalene and p-styrene sulfonate; vinyl esters such as vinyl acetate, vinyl propionate, vinyl butyrate, trimethylacetic acid, vinyl caproate, vinyl caprylate, vinyl laurate and vinyl stearate; conjugated dienes such as butadiene and isoprene; olefins such as ethylene, propylene, 1-butene, isobutylene, and 3-methyl-1-butene; and allyl compounds such as allyl chloride, diallyl phthalate, allyl alcohol and allylsulfonic acid.

The molecular weight of the polycarboxylic acid is preferably from 260 to 1,000,000 and, specifically, from 1,000 to 70,000.

When F (fluorine) is contained in the bath for treatment, it is desired that the concentration of F ions in the bath for treatment is in a range of from 0.03 mols of F per liter to 0.35 mols of F per liter. If the concentration of F ions is lower than the above range, a gel-like substance forms on the metal surface which is the cathode impairing handling when the production is continued. Even from the standpoint of properties, the surface in a high temperature and high humidity environment loses stability after the passage of time, which is not desirable. If the concentration of the bath for treatment is higher than the above range, the efficiency of deposition tends to decrease, and precipitate easily forms in the bath for treatment, which is not desirable, either. The concentration of F ion in the bath for treatment can be measured by using a fluorine ion meter (e.g., IM-55G, electrode F-2021, manufactured by DKK-TOA CORPORATION).

As required, further, nitric acid ions, peroxide and complexing agent may be added to the bath for treatment of the invention. Nitric acid ions are effective in maintaining stable state of deposition while the electrolysis is undergoing for extended periods of time. Nitric acid, sodium nitrate, potassium nitrate and ammonium nitrate can be used as ion sources. Peroxide generates oxygen in an aqueous solution, is effective in suppressing polarization of concentration near the cathode surface, and is very effective when the bath for treatment is poorly stirred. As the peroxide, there can be used, for example, hydrogen peroxide, ammonium peroxodisulfate, potassium peroxodisulfate, sodium peroxoborate, sodium peroxocarbonate and sodium peroxodisulfate. Complexing agent works to suppress the formation of precipitates in the bath for treatment. Examples thereof are ethylenediaminetetraacetic acid, sodium ethylenediaminetetraacetate, citric acid, sodium citrate, boric acid, nitrilotriacetic acid, sodium nitrilotriacetate, cyclohexanediaminetetraacetic acid, glycine, gluconic acid, malonic acid, succinic acid, tartaric acid and phosphonic acid. A too high concentration of nitric acid ions, peroxide or complexing agent tends to decrease the efficiency of deposition. It is, therefore, desired that the concentrations of nitric acid ions, peroxide and complexing agent are each not more than 0.2 mols per liter.

As required, further, a variety of additives such as antibacterial agent, surfactant, anticorrosive and film deposition stabilizer can be added to the bath for treatment of the invention.

As the antibacterial agent, there can be exemplified alcohols such as ethanol and isopropanol; guanidine group-containing compounds such as polyhexamethylenebiguanidine hydrochlorate; benzoimidazoles such as 2-(4-thiazolyl)benzoimidazole and methyl-2-benzoimidazole carbamate; phthalimides such as N-(trichloromethylthio)-tetrahydrophthalimide and N-(fluorochloromethylthio)-phthalimide; phenols such as p-chloro-m-xylenol and p-chloro-m-cresol; nitriles such as 2,4,5,6-tetrachloroisophthalonitrile and 1,2-dibromo-2,4-dicyanobutane; pyridines such as sodium (2-pyridylthio-1-oxide) and zinc bis(2-pyridylthio-1-oxide); isothiazolones such as 2-methyl-4-isothiazoline-3-one and 5-chloro-2-methyl-4-isothiazoline-3-one; quaternary ammonium salts such as benzalkonium chloride and benzethonium chloride; and benzoic acid, ethyl p-oxybenzoate, sorbic acid, potassium sorbate, sodium dihydroacetate and sodium propionate.

As the surfactant, there can be exemplified nonionic surfactant, cationic surfactant and anionic surfactant.

As the anticorrosive, there can be exemplified tannic acid, imidazoles, triazines, guanines, hydrazines, biguanide, silane coupling agent, colloidal silica and amines.

As the film deposition stabilizer, there can be exemplified aluminum ions.

As the contamination components that are permissible, there can be exemplified sulfuric acid, phosphoric acid compounds, sulfonic acid compounds and chlorine compounds.

(Method of Producing Surface-Treated Steel Plates)

The method of treating the surfaces in the method of producing the surface-treated steel plate of the invention comprises conducting the cathodic electrolysis in the bath for surface treatment to forma surface-treating film on the surface of the steel plate. Here, as described above, the bath for treatment used in the invention is capable of conducting the treatment at a high speed, and the rate of deposition of Zr and/or Ti per a second of current flowing time is as high as not less than 80 $mg/m^2/sec$, i.e., the method of treating the surface exhibit excellent high-speed deposition.

The steel plate is pre-treated prior to treating the surface thereof. The steel plate is pre-treated in a customary manner; i.e., the surface is dewaxed, washed with water and, as required, washed with acid and then with water to clean the surface. In the case of the "tin-plated steel plate" forming a tin-plated layer, a so-called "cleaning treatment" can be conducted to remove tin oxides from the surface relying on the electrolytic reduction by using an alkali aqueous solution such as of sodium carbonate.

The steel plate after the surface is cleaned is subjected to the cathodic electrolysis with a current density in a range of from 0.5 to 100 $A/dm^2$ while being stirred in a bath for treatment adjusted to a temperature of from 30 to 65° C. It is, here, desired that the cathodic electrolysis is conducted for a total electrolysis time, which is the sum of current flowing time and the interrupting time, of 0.3 to 20 seconds relying on the intermittent electrolysis system repeating the cycle of flowing the electric current and interrupting the electric current. Finally, through the washing with water, there is obtained the surface-treated steel plate having a favorable film.

As a counter electrode plate that corresponds to the anode, there is preferably used a titanium plate coated with iridium oxide. The conditions required for the counter electrode plate are that it is an insoluble anode having a small oxygen overvoltage, the material thereof without dissolving in the treating solution during the electrolysis.

As described above, the bath for treatment of the invention desirably comprises an aqueous solution of a pH of from 2.0 to 6.0 and, more preferably, a PH of from 2.5 to 4.5. Generally, however, if the pH of the bath for treatment is low, the permissible concentration of dissolved Fe ions (inclusive of Sn ions if the steel plate has a tin-plated layer) tends to become high and if the pH is high, on the other hand, the permissible concentration thereof dissolved therein tends to become low. The Fe ions dissolved (inclusive of Sn ions if the steel plate has the tin-plated layer) in excess of the permissible concentration float or precipitate as oxides or hydroxides in the bath for treatment, and are trapped in the treating film to deteriorate the corrosion resistance of the film. It is, therefore, desired to quickly remove the Fe ions precipitated in the bath for treatment.

In the method of producing the surface-treated steel plate of the invention, as described above, the polycarboxylic acid induces the precipitation making it possible to remove the Fe ions at a pH lower than that of when no polycarboxylic acid is used. It is, therefore, desired to regenerate the bath for treatment by elevating the pH of the treating solution in the bath for treatment by about 0.2 to about 1.0 to precipitate and remove an iron polycarboxylate (inclusive of a tin polycarboxylate if the steel plate has the tin-plated layer), returning the pH of the bath for treatment back and, thereafter, adding the polycarboxylic acid so that the concentration of the polycarboxylic acid in the bath for treatment lies in a range of from 0.01 to 1.0 times as great as the concentration of Zr and/or Ti, and adjusting the concentration of Fe ions in the bath for treatment or adjusting the total concentration of Sn ions and Fe ions if the steel plate has a tin-plated layer to be always not more than 500 ppm.

The regeneration treatment may be such that the treating solution is transferred to a different bath for treatment to remove the Fe ions and Sn ions from the treating solution in the different bath for treatment, or that the Fe ions and Sn ions are removed in the passage for circulating the treating solution.

When the regeneration treatment is conducted in the different bath for treatment, the pH of the treating solution is elevated with an alkali component such as sodium hydroxide or ammonia, and the Fe ions and Sn ions are trapped with the polycarboxylic acid and are precipitated in the form of an iron polycarboxylate or a tin polycarboxylate so as to be removed. Thereafter, the pH of the treating solution is returned back with the acid component such as nitric acid or sulfuric acid, and the polycarboxylic acid is replenished so that the concentration of the polycarboxylic acid becomes 0.01 to 1.0 times as great as the concentration of Zr and/or Ti.

When the regeneration treatment is conducted in the circulation passage, it is desired to set the pH at the time of operating the bath for treatment to be higher than that of when the regeneration treatment is conducted in the different bath for treatment and to suppress the concentration of Fe ions and Sn ions that can be dissolved in the bath treatment to lie in a range that will not affect the properties of the film. The precipitated Fe and Sn are continuously removed by a filter or the like provided in the circulation passage, whereby the concentration of Fe ions dissolved in the bath for treatment or the total concentration of Sn ions and Fe ions if the steel plate has the tin-plated layer, is maintained to be not more than 500 ppm. The concentration of Fe ions and the concentration of Sn ions in the bath for treatment can be measured by using an ICP emission spectrometer (e.g., CIROS manufactured by Rigaku Corporation).

(Surface-Treated Steel Plates)

The surface-treated steel plate of the present invention is obtained by forming, on at least one surface of the steel plate by cathodic electrolysis, a chromium-free surface-treating film which contains a mixed oxide of an oxide of Fe and an oxide of Zr and/or Ti, and a polycarboxylic acid, the amount of Zr and/or Ti being from 3 to 300 mg/m$^2$ and the amount of C being from 0.1 to 5.0 mg/m$^2$.

Namely, if the amount of Zr and/or Ti is smaller than the above range, the corrosion resistance becomes poor. Even if the amount thereof is larger than the above range, properties are saturated posing disadvantage in economy. It is, therefore, important that the amount of Zr and/or Ti in the film lies in the above range.

If the amount of C is smaller than the above range, the amount of polycarboxylic acid in the film is not sufficient and the corrosion resistance becomes poor. If the amount of C is larger than the above range, on the other hand, close adhesion to the organic film becomes poor. It is, therefore, important that the amount of C in the film lies in the above range.

In the surface-treated steel plate of the invention, further, it is desired that a value of the atomic ratio represented by Fe/(Zr and/or Ti) or a value of the atomic ratio represented by (Fe and Sn)/(Zr and/or Ti) if the steel plate has a tin-plated layer, is not more than 1.0 from the standpoint of corrosion resistance.

When the bath for treatment contains Zr and/or Ti as well as F in a suitable amount, the surface-treating film assumes a stable structure such as $ZrO_x(OH)_{y-z}F_z$ or $TiO_x(OH)_{y-z}F_z$, suppressing a change in the structure of the treating layer in a high temperature and high humidity environment and maintaining a more stable surface.

(Surface-Treated Steel Plates Having an Organic Coating)

In the surface-treated steel plate having an organic coating of the invention, there is no specific limitation on the organic coating formed on the surface-treated steel plate and there can be used a resin coating comprising various thermoplastic resins or a film of a thermosetting coating material or a thermoplastic coating material.

As the resin coating comprising a thermoplastic resin, there can be used unstretched or biaxially stretched thermoplastic resin films, i.e., olefin resin films such as of polyethylene, polypropylene, ethylene/propylene copolymer, ethylene/vinyl acetate copolymer, ethylene/acrylic ester copolymer and ionomer; polyester films such as of polyethylene terephthalate and polybutylene terephthalate; polyamide films such as of nylon 6, nylon 6,6, nylon 11 and nylon 12; polyvinyl chloride film and polyvinylidene chloride film.

In forming the organic coating, a known adhesive primer or an adhesive can be provided between the surface-treated steel plate and the thermoplastic resin coating. The adhesive primer exhibits excellent adhesiveness to both the metal material and the film. As a primer coating material featuring excellent adhesiveness and corrosion resistance, there can be favorably used a phenol epoxy coating material comprising a resol type phenol-aldehyde resin derived from various phenols and formaldehydes and a bisphenol type epoxy resin and, specifically, a coating material that contains a phenol resin and an epoxy resin at a weight ratio of 50:50 to 1:99 and, particularly, 40:60 to 5:95. The adhesive primer layer is preferably formed maintaining a thickness of, usually, from 0.01 to 10 μm. The adhesive primer layer may have been formed on the surface-treated steel plate in advance or may be formed on the thermoplastic resin film.

As the adhesive, there can be preferably used urethane adhesive, epoxy adhesive, acid-modified olefin resin adhesive, copolyamide adhesive, or copolyester adhesive (thickness: 0.1 to 5.0 μm). Further, a thermosetting coating material may be applied onto the surface-treated steel plate or onto the film maintaining a thickness in a range of from 0.05 to 2 μm so as to be used as an adhesive.

The coating may be formed by using a thermoplastic or thermosetting coating material, i.e., modified epoxy coating material such as of phenol epoxy or amino epoxy; vinyl chloride/vinyl acetate copolymer, saponified product of vinyl chloride/vinyl acetate copolymer, vinyl chloride/vinyl acetate/maleic anhydride copolymer, epoxy-modified, epoxyamino-modified or epoxyphenol-modified vinyl coating material or modified vinyl coating material, acrylic coating material or synthetic rubber coating material such as of styrene/butadiene copolymer, which may be used alone or in a combination of two or more kinds.

Among them, a resin coating comprising a polyester resin which is a container material is most desirably used. As the polyester resin, there can be exemplified a thermoplastic polyester derived from an alcohol component comprising chiefly ethylene glycol or butylene glycol and an aromatic dibasic acid, i.e., an acid component such as terephthalic acid, isophthalic acid or naphthalenedicarboxylic acid.

As the polyester, it is allowable to use the polyethylene terephthalate itself, as a matter of course. From the standpoint of impact resistance and workability, however, it is desired to lower a maximum crystallinity that can be reached of the film. For this purpose, a copolymerized ester unit other than the ethylene terephthalate is better introduced into the polyester. It is, specifically, desired to use a copolymerized polyester comprising chiefly an ethylene terephthalate unit or a butylene terephthalate unit, containing other ester units in small amounts and having a melting point of from 210 to 252° C. The homopolyethylene terephthalate has a melting point of, usually, from 255 to 265° C.

It is, usually, desired that not less than 70 mol % and, specifically, not less than 75 mol % of the dibasic acid component in the copolymerized polyester comprises a terephthalic acid component, not less than 70 mol % and, specifically, not less than 75 mol % of the diol component comprises an ethylene glycol or a butylene glycol, and from 1 to 30 mol % and, specifically, from 5 to 25 mol % of the dibasic acid component comprises a dibasic acid component other than the terephthalic acid.

As the dibasic acids other than the terephthalic acid, there can be exemplified aromatic dicarboxylic acids such as isophthalic acid, phthalic acid and naphthalenedicarboxylic acid; alicyclic dicarboxylic acids such as cyclohexanedicarboxylic acid; aliphatic dicarboxylic acids such as succinic acid, adipic acid, sebacic acid and dodecanedioic acid; and dimeric acid obtained by dimerizing an unsaturated fatty acid having 10 to 25 carbon atoms, which may be used in one kind or in a combination of two or more kinds. As the diol components other than the ethylene glycol or the butylene glycol, there can be exemplified one or two or more kinds of propylene glycol, diethylene glycol, 1,6-hexylene glycol, cyclohexanedimethanol and ethylene oxide adducts of bisphenol A. In using these comonomers in combination, as the matter of course, it is desired that the melting point of the copolymerized polyester lies in the above-mentioned range.

In order to improve melt-flow property at the time of forming, the polyester can contain at least one kind of branched or crosslinked component selected from the group consisting of trifunctional or more highly functional polybasic acids and polyhydric alcohols. It is desired that the branched or crosslinked component is contained in an amount of not more than 3.0 mol % and, preferably, in a range of from 0.05 to 3.0 mol %.

As the trifunctional or more highly functional polybasic acids and polyhydric alcohols, there can be exemplified such polybasic acids as trimellitic acid, pyromellitic acid, hemimellitic acid, 1,1,2,2-ethanetetracarboxylic acid, 1,1,2-ethanetricarboxylic acid, 1,3,5-pentanetricarboxylic acid, 1,2,3,4-cyclopentanetetracarboxylic acid and biphenyl-3,4,3',4'-tetracarboxylic acid, and such polyhydric alcohols as pentaerythritol, glycerol, trimethylolpropane, 1,2,6-hexanetriol, sorbitol and 1,1,4,4-tetrakis(hydroxymethyl)cyclohexane.

In the surface-treated steel plate having the organic coating of the invention, the polyester resin that can be particularly preferably used as a material for producing cans or can lids is exemplified by a polyethylene terephthalate/isophthalate containing 5 to 25 mol % of an isophthalic acid component, and a polyethylene terephthalate/cyclohexylenedimethylene terephthalate containing 1 to 10 mol % of a cyclohexanedimethanol component.

The homopolyester or the copolymerized polyester should have a molecular weight in a range for forming a film, and preferably has an intrinsic viscosity [η] of from 0.5 to 1.5 and, specifically, from 0.6 to 1.5 as measured by using a phenol/tetrachloroethane mixed solvent as a solvent.

The thermoplastic resin coating used for the surface-treated steel plate having the organic coating of the invention may be formed of the above polyester or copolyester alone, may be formed of a blend of two or more kinds of polyesters or copolyesters, or may be formed of a blend of polyesters or copolyesters with other thermoplastic resins. As the blends of two or more kinds of polyesters or copolyesters, there can be exemplified combinations of two or more kinds of polyethylene terephthalate, polybutylene terephthalate, polyethylene terephthalate/isophthalate, and polyethylene terephthalate/cyclohexylenedimethylene terephthalate to which only, however, the invention is in no way limited.

As the other thermoplastic resins that can be added to the polyester, there can be exemplified ethylene polymer, thermoplastic elastomer, polyallylate and polycarbonate. Upon further containing at least one of these reforming resin components, it is allowed to further improve the resistance against high temperatures and wet heated conditions, and impact resistance. The reforming resin component is, usually, used in an amount of, preferably, up to 50 parts by weight and, specifically preferably, in an amount of from 5 to 35 parts by weight per 100 parts by weight of the polyester.

As the ethylene polymer, there can be exemplified low-, medium- or high-density polyethylene, linear low-density polyethylene, linear ultra-low-density polyethylene, ethylene/propylene copolymer, ethylene/butene-1 copolymer, ethylene/propylene/butene-1 copolymer, ethylene/vinyl acetate copolymer, ionically crosslinked olefin copolymer (ionomer) and ethylene/acrylic ester copolymer. Among them, the ionomer is preferred. As a base polymer of the ionomer, there can be used ethylene/(meth)acrylic acid copolymer or ethylene/(meth)acrylic ester/(meth)acrylic acid copolymer. As the ion species, there can be used Na, K or Zn. As the thermoplastic elastomer, there can be used styrene/butadiene/styrene block copolymer, styrene/isoprene/styrene block copolymer, hydrogenated styrene/butadiene/styrene block copolymer or hydrogenated styrene/isoprene/styrene block copolymer.

The polyallylate is defined to be a polyester derived from dihydric phenol and a dibasic acid. As the dihydric phenol, there can be used 2,2'-bis(4-hydroxyphenyl)propane (bisphenol A), 2,2'-bis(4-hydroxyphenyl)butane (bisphenol B), 1,1'-bis(4-hydroxyphenyl)ethane, bis(4-hydroxyphenyl) methane (bisphenol F), 4-hydroxyphenyl ether, and p-(4-hydroxy)phenol as bisphenols. Among them, however, bisphenol A and bisphenol B are preferred. As the dibasic acid, there can be used terephthalic acid, isophthalic acid, 2,2-(4-carboxyphenyl)propane, 4,4'-dicarboxydiphenyl ether, and 4,4'-dicarboxybenzophenone. The polyallylate may be a homopolymer derived from the monomer components or may be a copolymer thereof.

Or the polyallylate may be a copolymer with an ester unit derived from an aliphatic glycol and the dibasic acid in a range in which its essential properties are not affected. These polyallylates are available in the names of U-Polymers of U-Series or AX-Series manufactured by UNITIKA LTD., Ardel D-100 manufactured by Union Calbide Corporation, APE manufactured by Bayer Holding Ltd., Durel manufactured by Hoechst AG., Arylon manufactured by E. I. du Pont de Nemours and Company and NAP resins manufactured by Kanegafuchi Chemical Ind. Co., Ltd.

The polycarbonate is a carbonic acid ester resin derived from bicyclic dihydric phenols and phosgene, and features a high glass transition point and heat resistance. The polycarbonate is preferably a polycarbonate derived from bisphenols such as 2,2'-bis(4-hydroxyphenyl)propane (bisphenol A), 2,2'-bis(4-hydroxyphenyl)butane (bisphenol B), 1,1'-bis(4-hydroxyphenyl)ethane, bis(4-hydroxyphenyl)methane (bisphenol F), 1,1-bis(4-hydroxyphenyl)cyclohexane, 1,1-bis(4-hydroxyphenyl)cyclopentane, 1,1-bis(4-hydroxyphenyl)-1-phenylmethane, 1,1-bis(4-hydroxyphenyl)-1-phenylethane and 1,2-bis(4-hydroxyphenyl)ethane.

The thermoplastic resin coating of the surface-treated steel plate having the organic coating of the invention may be a single resin layer or a multiplicity of resin layers formed by the simultaneous extrusion or the like method. Use of the multiplicity of polyester resin layers is advantageous since it is allowed to select a polyester resin of a composition having excellent adhesiveness as the underlying layer, i.e., as the layer on the side of the surface-treated steel plate and to select, as the surface layer, a polyester resin of a composition having excellent resistance against the content, i.e., resistance against being extracted while not adsorbing flavor components.

Examples of the multiplicity of polyester resin layers include, being expressed as surface layer/lower layer, polyethylene terephthalate/polyethylene terephthalate.isophthalate, polyethylene terephthalate/polyethylene.cyclohexylenedimethylene.terephthalate, polyethylene terephthalate.isophthalate having a small isophthalate content/polyethylene terephthalate.isophthalate having a large isophthalate content, polyethylene terephthalate.isophthalate/[blend of polyethylene terephthalate.isophthalate and polybutylene terephthalate.adipate], to which only, however, the invention is in no way limited. The thickness ratio of the surface layer:lower layer is, desirably, in a range of from 5:95 to 95:5.

The organic coating can be blended with known blending agents for resins, such as anti-blocking agent like amorphous silica, inorganic filler, various antistatic agents, lubricating agent, antioxidant and ultraviolet ray absorber according to a known recipe.

Among them, it is desired to use a tocopherol (vitamin E). It has heretofore been known that the tocopherol works as an antioxidant preventing a decrease in the molecular weight caused by the oxidation and decomposition at the time when the polyester resin is treated with heat, and improving the dent resistance. Specifically, if the tocopherol is added to a polyester composition comprising the polyester resin to which the above-mentioned ethylene polymer is added as a reforming resin component, not only the dent resistance but also the corrosion resistance are markedly improved preventing corrosion that may occur from the cracks in case the film is cracked being subjected to severe conditions such as of retort sterilization or in a hot vendor.

The tocopherol is used in an amount of, desirably, from 0.05 to 3% by weight and, specifically, 0.1 to 2% by weight.

In the invention, it is desired that the organic coating has a thickness in a range of, usually, from 3 to 50 μm and, specifically, 5 to 40 μm as the thermoplastic resin coating and, in the case of the film, has a thickness in a range of from 1 to 50 μm and, specifically, from 3 to 30 μm after baked. If the thickness is smaller than the above range, corrosion resistance is not sufficient. If the thickness exceeds the above range, problems tend to occur from the standpoint of workability.

In the invention, the organic coating can be formed on the surface-treated steel plate by any means. For example, the thermoplastic resin coating can be formed by the extrusion-coating method, cast film heat-adhering method or biaxially stretched film heat-adhering method. In the case of the extrusion-coating method, the surface-treated metal material is extrusion-coated with the polyester resin in a molten state which, therefore, heat-adheres thereto. Namely, the polyester resin is melt-kneaded by an extruder and is extruded into a thin film through a T-die. The extruded molten resin film is passed through a pair of laminating rolls together with the surface-treated metal material so as to be pressed thereon as a unitary structure while cooling, followed by quenching. When the surface-treated metal material is to be extrusion-coated with the multiplicity of polyester resin layers, use is made of an extruder for extruding the surface resin layer and an extruder for extruding the lower resin layer, and the resin flows from the extruders are met together in a die for forming a multiplicity of layers, followed by the extrusion coating in the same manner as in the case of forming the single resin layer. By passing the surface-treated metal material through the pair of laminating rolls perpendicularly thereto and feeding molten resin webs onto both sides thereof, further, it is allowed to form polyester resin coatings on both surfaces of the base material.

The surface-treated steel plate having the organic coating of polyester resin is produced by the extrusion-coating method as described below concretely. Namely, the surface-treated steel plate is, as required, pre-heated by a heating device and is fed to a nip position between the pair of laminating rolls. The polyester resin, on the other hand, is extruded in the form of a thin film through a die head of the extruder, is fed to between the laminating roll and the surface-treated steel plate, and is press-adhered onto the surface-treated steel plate by the laminating rolls. The laminating rolls are maintained at a predetermined temperature. The thin film of a thermoplastic resin such as polyester is press-adhered onto the surface-treated steel plate, and the two are heat-adhered together and are cooled from both sides thereof to thereby obtain a surface-treated steel plate having the organic coating. Usually, the thus formed surface-treated steel plate having the organic coating is, further, introduced into a water vessel for cooling and is quenched therein to prevent heat crystallization.

In the extrusion-coating method, the resin composition is selected and the surface-treated steel plate having the organic coating is quenched through the rolls and the cooling vessel. Therefore, the polyester resin layer is suppressed from being crystallized producing a difference from the amorphous density thereof of not more than 0.05 g/cm$^3$, and guaranteeing a sufficient degree of workability for the subsequent works of making cans and lids. The quenching operation is not limited to the above-mentioned example only, as a matter of course; i.e., the laminated plate can be also quenched by spraying cooling water onto the formed surface-treated steel plate having the organic coating.

The polyester resin is heat-adhered onto the surface-treated steel plate by utilizing the quantity of heat possessed by the molten resin layer and the quantity of heat possessed by the surface-treated steel plate. The temperature ($T_1$) for heating the surface-treated steel plate is, usually, from 90° C. to 290° C. and, specifically, from 100° C. to 280° C. while the temperature of the laminating rolls is suitably in a range of from 10° C. to 150° C.

The surface-treated steel plate having the organic coating of the invention can be also produced by heat-adhering, onto the surface-treated steel plate, a polyester resin film that has been formed in advance by a T-die method or an inflation film-forming method. As the film, there can be used an unstretched film obtained by the cast-forming method by quenching the extruded film or a biaxially stretched film obtained by biaxially stretching the film at a stretching temperature successively or simultaneously, and heat-setting the film after it has been stretched.

(Can Bodies)

The can body of the invention can be produced by any can-making method so far as it is made from the above-mentioned surface-treated steel plate having the organic coating, and may be a three-piece can (welded can) having seams on the side surfaces or a seamless can (two-piece can).

The seamless cans are produced relying upon a known means such as draw working, draw•redraw working, bend-elongation working (stretch working) by draw•redrawing, bend-elongation ironing working by draw•redrawing, or draw•ironing working.

When the welded cans are to be produced by the invention, it is desired that the surface-treated steel plate having the organic coating is a tin-plated steel plate of which the surface is treated. When a draw-worked can is to be produced that is worked to a relatively low degree, there can be used various embodiments of surface-treated steel plates having the organic coating of the invention without limitation.

For the seamless cans obtained through a high degree of working such as bend-elongation working (stretch working) by draw•redrawing or bend-elongation•ironing working by draw•redrawing, the organic coating is, particularly desirably, a thermoplastic resin coating formed by the extrusion-coating method.

Namely, since the surface-treated steel plate having the organic coating features excellent adhesion during the working, the coating maintains excellent adhesion even when being put to severe working, and, therefore, a seamless can having excellent corrosion resistance can be provided.

(Can Lids)

The can lids of the invention can be produced by any known lid-making method so far as they are made from the above-mentioned surface-treated steel plate having the organic coating, and can be applied to flat lids, easy-open can lids of the stay-on-tab type and to easy-open can lids of the full-open type.

The can lids of the invention can be formed by using various embodiments of the surface-treated steel plates having the organic coating of the invention without limitation.

EXAMPLES

The invention will be described below more concretely by way of Examples to which only, however, the invention is not limited. The materials to be treated, dewaxing agents and organic coatings were those arbitrarily selected from those materials placed in the market, and do not impose any limitation on the solution for treating surfaces or on the method of treating surfaces of the present invention.

In Tables appearing below, "–" means that no measurement was taken.

[Kinds of Baths for Treatment]

Zirconium agent and/or titanium agent and polycarboxylic acid (PC) component were added to an aqueous solution in such amounts that the concentrations thereof were as shown in Table 1 as Zr, Ti and PC, and the pH was adjusted with nitric acid or ammonia. In the baths A to BC for treatment in Table 1, a polyitaconic acid (trade name: PIA-728, average weight molecular weight of about 3000 manufactured by IWATA CHEMICAL CO., LTD.) was used as the polycarboxylic acid. In the bath CA for treatment, a polyacrylic acid (trade name: AQUALIC HL-415, weight average molecular weight of about 10,000 manufactured by NIPPON SHOKUBAI CO., LTD.) was used as the polycarboxylic acid. Ammonium zirconium fluoride was used as the zirconium agent. As the titanium agent, there was used an ammonium titanium fluoride. No aqueous solution in the baths for treatment shown in Table 1 caused precipitation.

[Preparation of the Surface-Treated Steel Plates]

A low-carbon cold-rolled steel plate of a thickness of 0.225 mm was used, unless stated otherwise, as a sample material in Examples and Comparative Examples. As the pre-treatment, the steel plate was electrolytically dewaxed in an aqueous solution of a commercially available dewaxing agent (Formula 618-TK2 (trade name) manufactured by Nippon Quaker Chemical Ltd.), washed with water, dipped in an aqueous solution of sulfuric acid to wash with acid, and was washed with water. Thereafter, the surface of the steel plate was treated one to 24 times, the treatment of each time consisting of flowing a current with a density of 1 A/dm$^2$ to 10 A/dm$^2$ for 0.15 seconds and an interrupting the current for 0.50 seconds, and washed with water and dried to obtain a surface-treated plate.

[Preparation of the Surface-Treated Steel Plates Having the Organic Coating]

The surface-treated steel plate having the organic coating was obtained by applying an organic resin coating material or by heat-laminating a thermoplastic resin film onto one surface or both surfaces of the surface-treated steel plate obtained as described above. When the surface-treated steel plate having the thermoplastic resin coating was to be prepared by lamination, a non-oriented cast film or a stretched film was used as the coating. Tables 2-1 and 2-2 show constitutions of the polyester resin films used in Examples. In Table 2-2, the word "white" represents a film laminated on the outer surface of the can and containing titanium oxide as a white pigment.

The surface-treated steel plate having polyester coating was obtained by heat-press-adhering a polyester film onto the surface-treated steel plate which was heated through the laminating rolls readily followed by cooling with water. The heating temperature was 250° C. in the case of a steel plate and 220° C. in the case of a tin-plated steel plate. When the stretched film was to be laminated, the temperature of the laminating rolls was so controlled that a suitably oriented state remained in the film in compliance with the method of preparing a surface-treated steel plate having polyester coating for seamless cans that have been placed in the market.

[Measuring the Components in the Bath for Treatment]

The concentrations of Zr, Ti and Fe ions were measured by using an ICP emission spectrometer CIROS (manufactured by Rigaku Corporation), and the PC concentration was found by converting the concentration of organic carbon measured by using a total organic carbon meter TOC-5000 (manufactured by Shimadzu Corporation) into a concentration of polycarboxylic acid. The conversion of the concentration of organic carbon into the concentration of polycarboxylic acid is represented by the following formula.

(Concentration of organic carbon)×(molecular weight of a monomer of polycarboxylic acid)÷(number of carbon atoms in a monomer of polycarboxylic acid×12.01)

[Measuring the Amount of the Film]

The amounts of Zr and Ti in the film were measured by using an X-ray fluorescence analyzer ZSX100e (manufactured by Rigaku Corporation), and the amount of C in the film was measured by using a carbon.hydrogen/water analyzer RC612 (manufactured by Leco Corporation).

[Spot Measurement of the Fe/Zr Atomic Ratio and (Fe and Sn)/Zr Atomic Ratio in the Film]

Carbon (C) was vapor-deposited on the steel plate after its surface has been treated and, thereafter, C was, further, deposited by about 1 μm in an FIB apparatus. A sample was cut out by a micro-sampling method and was fixed on a support plate made of Cu. Thereafter, a cross-section sample for observation with TEM was prepared by using the FIB, and was observed for its cross section by using the TEM and analyzed by using the EDS to calculate Fe/Zr atomic ratio and (Fe and Sn)/Zr atomic ratio.

<FIB> Focused ion beam apparatus, model FB-2000C, acceleration voltage, 40 kV, manufactured by Hitachi, Ltd.
<TEM> Field emission type transmission electron microscope, model JEM-2010F, acceleration voltage, 200 kV, manufactured by JEOL Ltd.
<EDS> UTW-type Si(Li) semiconductor detector, analyzing region, 1 nm, manufactured by NORAN Instruments, Inc.

Figure 4:
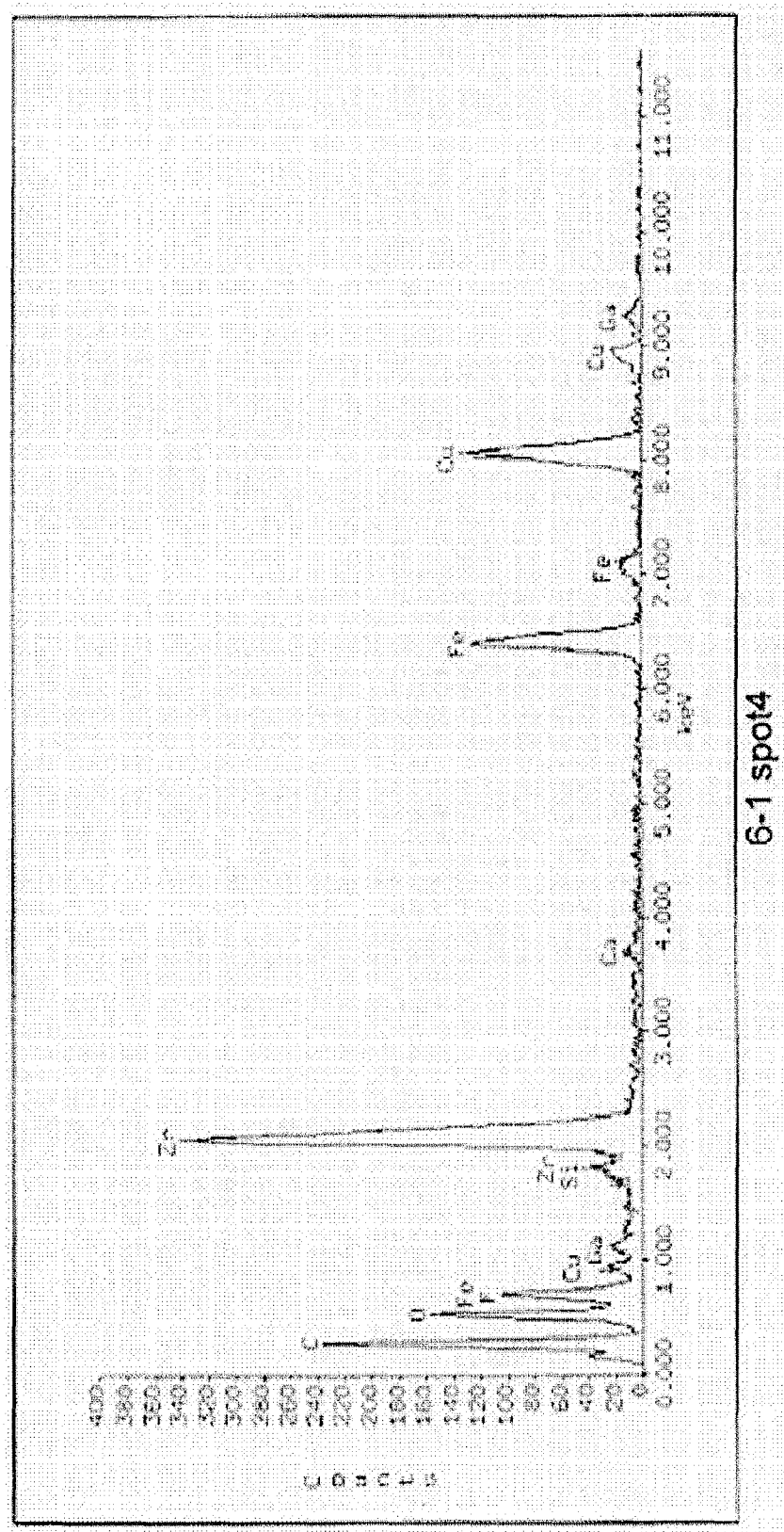
FIG. 4 is a diagram showing spectrum of X-ray spectrometric analysis (EDS) of a treating film formed by the invention.

As reference data, FIG. 4 shows EDS spectra of the treating film of the present invention. Here, C contains contamination data of the surface of the sample, and Cu stems from the sample-support plate and Ga stems from Ga ions injected at the time of working by using the FIB. The atomic ratios of Fe and Zr and/or Ti were calculated from the spectra of FIG. 4.

[Evaluating the Cross-Cut Corrosion Resistance]

By using a cutter, the surface-treated steel plate having the organic resin coating was cut over a length of 4 cm and in a depth to reach the base metal, and was dipped in a commercially available coffee (trade name: Blendy, bottled coffee, low sugar, produced by Ajinomoto General Foods, Inc.) maintained at 37° C. to evaluate the corroded state after the passage of time. During the testing, the coffee was renewed at regular intervals so as to suppress the growth of mold as much as possible.

The test pieces were evaluated on the following basis. Namely, the test piece that was discolored by less than 0.5 mm at the ends of the cross-cut portion on each side was evaluated to be 5 points, the test piece discolored by not less than 0.5 mm but less than 1 mm was evaluated to be 4 points, the test piece discolored by not less than 1 mm but less than 2 mm was evaluated to be 3 points, the test piece discolored by not less than 2 mm but less than 3 mm was evaluated to be 2 points, and the test piece discolored not less than the above was evaluated to be 0 point. The test pieces evaluated to be not less than 3 points were regarded to be usable.

[Evaluating the Adhesiveness]

The surface-treated steel plate having the resin coating was cut into a rectangular strip of 15 mm wide and 70 mm long. The strip was cut in the surface on the side opposite to the side of taking measurement into a depth of reaching the base metal at a position 30 mm away from the end of the strip. The test piece was retort-treated in hot water of 120° C. for 30 minutes and was, thereafter, once dipped in water and was pulled out of water just before taking a measurement. The cut piece was repetitively folded with the cut portion formed above as a folding point until the metal piece only was broken to obtain a portion that was connected by the resin film only. Next, with this portion as the inner surface side, a 180-degree peeling test was conducted at a tension speed of 5 mm/min to measure the strength of adhesion.

Example 1

As the bath for treatment, a bath K of Table 1 was used and to which an aqueous solution of iron nitrate was added to obtain a solution containing 200 ppm of Fe ions. During this period, ammonia or nitric acid was added to maintain the pH of the bath for treatment at 2.5. The solution was taken into a container of an inner diameter of 45 mm, the pH thereof was adjusted with ammonia to be 3.0, and the height of precipitation was measured with visual observation after the solution was left to stand still for 6 hours. Further, the concentration of PC and the concentration of Fe ions in the supernatant portion were measured in the same manner as that of measuring the components of the bath for treatment. Differences were found from the initial concentration of PC and initial concentration of Fe ions, and were regarded to be the amounts of components precipitated from the treating solution. The obtained values were as shown in Table 3.

Example 2

The procedure was carried out in the same manner as in Example 1 but using a bath L for treatment.

Example 3

The procedure was carried out in the same manner as in Example 1 but using a bath C for treatment.

Example 4

The procedure was carried out in the same manner as in Example 1 but using a bath 0 for treatment.

Example 5

The procedure was carried out in the same manner as in Example 1 but adjusting the pH to 3.5 after the solution has been taken into the container.

Examples 6 to 10

The procedure was carried out in the same manner as in Example 5 but using baths L, C, O, AA and AB for treatment.

Example 11

The procedure was carried out in the same manner as in Example 1 but preparing the solution containing 800 ppm of Fe ions, and without adjusting the pH after the solution has been taken into the container.

Examples 12 to 16

The procedure was carried out in the same manner as in Example 11 but using baths L, C, O, AA and AB for treatment.

Example 17

The procedure was carried out in the same manner as in Example 11 but using a bath CA for treatment of Table 1 and preparing a solution containing 600 ppm of Fe ions.

Example 18

The procedure was carried out in the same manner as in Example 17 but using the bath C for treatment of Table 1 and preparing a solution containing 1200 ppm of Sn ions by the addition of an Sn ion standard solution (produced by Wako Pure Chemical Industries, Ltd.). The amounts of PC component and Sn component that precipitated were measured in the same manner as in Example 1.

Example 19

The procedure was carried out in the same manner as in Example 18 but preparing a solution containing 600 ppm of Sn ions by using the Sn ion standard solution (produced by Wako Pure Chemical Industries, Ltd.) and adjusting the pH of the solution with ammonia to 3.0 after the solution has been taken into the container.

Comparative Example 1

The procedure was carried out in the same manner as in Example 1 but using a bath J for treatment.

Comparative Examples 2 to 4

The procedure was carried out in the same manner as in Example 5 but using baths J, BA and BB for treatment.

Comparative Examples 5 to 7

The procedure was carried out in the same manner as in Example 11 but using baths J, BA and BB for treatment.

Comparative Example 8

The procedure was carried out in the same manner as in Example 18 but using the bath J for treatment of Table 1.

Comparative Example 9

The procedure was carried out in the same manner as in Example 19 but using the bath J for treatment of Table 1.

Example 20

By using a steel plate which has been dewaxed and washed with acid and by using the bath C for treatment of Table 1, a total of 6 kinds of surface-treated steel plates were produced in accordance with the above-mentioned method of producing the surface-treated steel plate by carrying out the treatment with a current density of 4 A/dm$^2$ for 2, 3 and 4 times or by carrying out the treatment with a current density of 10 A/dm$^2$ for 1, 2 and 3 times. A polyester film c of Table 2-2 was laminated on both surfaces of the thus produced surface-treated steel plates and was quenched in water to produce the surface-treated steel plates having resin coatings. Next, the surface-treated steel plates having the resin coatings were cut into squares of a side of 45 mm and were coated on their edge portions. Thereafter, in compliance with the above-mentioned method of evaluating the cross-cut corrosion resistance, the samples were prepared therefrom, and were left to stand in a coffee maintained at 37° C. under atmospheric pressure for 6 weeks. The six kinds of the samples were evaluated for their average points. Table 4 shows the ranges (minimum values to maximum values) of Zr amounts and C amounts in the surface-treating films of the samples and the evaluated results of cross-cut corrosion resistance.

Examples 21 to 23

The procedure was carried out in the same manner as in Example 20 but adjusting the concentration of Fe ions in the bath for treatment to 200, 400 and 600 ppm by the same method as that of Example 1.

Examples 24 to 27

The procedure was carried out in the same manner as in Example 20 but using the bath L for treatment of Table 1 and adjusting the concentration of Fe ions in the bath for treatment to 0, 200, 400 and 600 ppm by the same method as that of Example 1.

Examples 28 to 31

The procedure was carried out in the same manner as in Example 20 but using the bath 0 for treatment of Table 1 and adjusting the concentration of Fe ions in the bath for treatment to 0, 200, 400 and 600 ppm by the same method as that of Example 1.

Examples 32 to 35

The procedure was carried out in the same manner as in Example 20 but using the bath K for treatment of Table 1 and adjusting the concentration of Fe ions in the bath for treatment to 0, 200, 400 and 600 ppm by the same method as that of Example 1.

Examples 36 to 39

The procedure was carried out in the same manner as in Example 20 but using the bath A for treatment of Table 1 and adjusting the concentration of Fe ions in the bath for treatment to 0, 200, 400 and 600 ppm by the same method as that of Example 1.

Examples 40 to 43

The procedure was carried out in the same manner as in Example 20 but using the bath B for treatment of Table 1 and adjusting the concentration of Fe ions in the bath for treatment to 0, 200, 400 and 600 ppm by the same method as that of Example 1.

Examples 44 to 47

The procedure was carried out in the same manner as in Example 20 but using the bath G for treatment of Table 1 and adjusting the concentration of Fe ions in the bath for treatment to 0, 200, 400 and 600 ppm by the same method as that of Example 1.

Examples 48 to 51

The procedure was carried out in the same manner as in Example 20 but using the bath H for treatment of Table 1 and adjusting the concentration of Fe ions in the bath for treatment to 0, 200, 400 and 600 ppm by the same method as that of Example 1.

Examples 52 and 53

The procedure was carried out in the same manner as in Example 20 but using the bath CA for treatment of Table 1 and adjusting the concentration of Fe ions in the bath for treatment to 0 and 300 ppm by the same method as that of Example 1.

Comparative Examples 10 to 13

The procedure was carried out in the same manner as in Example 20 but using the bath J for treatment of Table 1 and adjusting the concentration of Fe ions in the bath for treatment to 0, 200, 400 and 600 ppm by the same method as that of Example 1.

Example 54

By using the bath C for treatment of Table 1, the electric conductivity of the bath for treatment was measured by using a conductivity meter at room temperature. Thereafter, the temperature of the bath C was elevated to 45° C., the steel plate was dewaxed and washed with acid in a customary manner, and was subjected to the cathodic electrolytic treatment maintaining a distance of 15 mm to the anode. The surface was treated by repeating the cathodic electrolytic treatment four times, the treatment of each time consisting of executing the cathodic electrolysis with 10 A/dm$^2$ for 0.15 seconds and interrupting the electrolysis for 0.5 seconds. The voltage of a rectifier during the electrolysis was recorded, the amount of the Zr film was measured by the fluorescent X-ray method, and a value thereof was divided by 0.15 sec.×4=0.60 sec. to find the rate of Zr deposition per a second of current flowing time. The results were as shown in Table 5.

Examples 55 to 65

The procedure was carried out in the same manner as in Example 54 but using the baths D, E, F, G, H, L, K, O, I, A and B for treatment.

Comparative Examples 14 to 16

The procedure was carried out in the same manner as in Example 54 but treating the surfaces by dipping the steel plate in the baths C, L and H for treatment of Table 1 at 45° C. for 30 seconds, measuring the amounts of the films, and dividing the amounts thereof by 30 seconds to find the rates of Zr deposition per a second of current flowing time.

Examples 66 and 67

By using the bath C for treatment of Table 1 and maintaining the bath temperature at 45° C., the steel plate was repetitively dipped therein each time for 10 seconds in a manner that the surface of the steel plate was 15 m$^2$ per kilogram of the treating bath to obtain the bath for treatment with Fe ions dissolved therein but without still removing the precipitate. During this period, the pH of the bath for treatment was maintained to be 2.5 at all times by adding ammonia or nitric acid. By using a different vessel, the pH of the bath for treatment was adjusted with ammonia to be 3.0, the precipitate was removed by using a filter, and the pH was returned back again to 2.5 with the nitric acid to obtain the bath for treatment after the precipitate has been removed. The surface-treated steel plates having the resin coating were produced in the same manner as in Example 20 but using the baths for treatment before and after the precipitate was removed, conducting the surface treatment with 10 A/dm$^2$ 4 times and repeating this operation 6 times. The surface-treated steel plates having the resin coating were evaluated for their cross-cut corrosion resistance. Table 6 shows the concentrations of the baths for treatment before and after the precipitate was removed and the evaluated results.

Examples 68 to 70

Steel plates were dewaxed, washed with acid, plated with tin in an amount of 2.8 g/m$^2$ per one surface, and reflow-treated. Next, by using the bath D for treatment of Table 1 and maintaining the bath temperature at 45° C., the surfaces were treated by repeating the cathodic electrolysis with a current of 10 A/dm$^2$ for 0.15 seconds followed by the interruption of electrolysis for 0.5 seconds four times to produce the surface-treated steel plates. The surface-treated steel plates were also produced by using a bath (SA) for treatment of which the pH was maintained at 3.0 by the addition of ammonia or nitric acid and which contained 100 ppm of Fe ions and 300 ppm of Sn ions by adding an aqueous solution of iron nitrate and an aqueous solution of tin chloride to the bath D for treatment. The surface-treated steel plates were also produced by using a bath (SB) for treatment of which the pH was maintained at 3.0 and contained 200 ppm of Fe ions and 400 ppm of Sn ions by the same manner as in the bath (SA).

Thereafter, the surface-treated steel plates having the resin coating were produced in the same manner as in Example 66, and the strength of adhesion was evaluated in compliance with the above-mentioned method of evaluating the adhesion. The results were as shown in Table 7. The acceptable range was not less than 3.0 N/15 mm. The value is better higher, as a matter of course.

Comparative Example 17

The strength of adhesion was evaluated in the same manner as in Example 68 but using the bath J for treatment of Table 1.

Comparative Example 18

A chromate-treated tin plate (amount of Sn, 2.8 g/m$^2$, 311-treatment) available in the market was coated with a resin in the same manner as in Example 68 to evaluate the adhesiveness.

Examples 71 to 87

Cold-rolled steel plates of a thickness of 0.225 mm were elecrolytically dewaxed and washed with acid. By using the baths A to F, I and K to O for treatment having pH values of 2.5 to 4.0 and maintained at 45° C. as shown in Table 1, the cathodic electrolysis was repeated 1 to 24 times by using, as an anode, an iridium oxide-coated titanium plate disposed at a position maintaining a distance between electrodes of 15 mm, the cathodic electrolysis of each time being conducted with a current density of 4 to 10 A/dm$^2$ for 0.15 seconds followed by an interruption of 0.50 seconds. Immediately thereafter, the steel plates were washed with water and dried to obtain surface-treated plates. The thus obtained surface-treated plates were heated by a hot plate up to a plate temperature of 250° C. Immediately, thereafter, the polyester film c of Table 2-2 was thermally press-adhered onto both surfaces of the plates via laminating rolls followed by cooling with water to produce the laminated members. The results were as shown in Table 8. The cross-cut corrosion resistances were those values evaluated after the laminated members were left to stand in coffee for 4 weeks.

Example 88

The procedure was carried out in the same manner as in Example 71 but using the bath AC for treatment of Table 1 and conducting the treatment under the electrolytic conditions shown in Table 8.

Example 89

The procedure was carried out in the same manner as in Example 71 but using the bath C for treatment of Table 1 of which the Fe ion concentration has been adjusted to be 600 ppm by the same method as that of Example 1 and conducting the treatment under the electrolytic conditions shown in Table 8.

Examples 90 to 92

The procedure was carried out in the same manner as in Example 71 but using the baths P, C and O for treatment of Table 1 and conducting the treatment under the electrolytic conditions shown in Table 8.

Comparative Example 19 and 20

The procedure was carried out in the same manner as in Example 71 but using the bath J for treatment of Table 1 in the case of Comparative Example 19 and, in the case of Comparative Example 20, adjusting the Fe ion concentration to 600 ppm by the same method as that of Example 1.

Comparative Example 21

The procedure was carried out in the same manner as in Example 71 but using the bath C for treatment of Table 1 and dipping the steel plate in the bath for treatment for 20 seconds without, however, conducting the cathodic electrolysis.

Comparative Example 22

The procedure was carried out in the same manner as in Example 88 but using the bath BC for treatment of Table 1.

Comparative Example 23

The steel plate was electrolytically dewaxed, washed with water, washed with acid, washed with water, was so treated that the amount of chromium was 130 mg/m$^2$ and the amount of chromium oxide hydrate was 20 mg/m$^2$ per one surface, and was readily washed with water and dried to obtain a surface-treated plate. Thereafter, the procedure was carried out in the same manner as in Example 71.

Examples 93 to 95

Steel plates were electrolytically dewaxed, washed with water, washed with acid, washed with water, plated with tin in an amount of 2.8 g/m$^2$ per one surface, and reflow-treated. Next, by using the bath D for treatment of Table 1, the steel plates were cathodically electrolyzed and were immediately washed with water and dried to obtain surface-treated plates. A film was laminated on the thus obtained surface-treated plates in the same manner as in Example 71, and the surface-treated plates were evaluated for their cross-cut corrosion resistance and adhesiveness. The results were as shown in Table 9.

Example 96

1. Production of a Surface-Treated Steel Plate.

A cold-rolled steel plate having a thickness of 0.225 mm and a tempering degree of T3 was electrolytically dewaxed and washed with acid as a pre-treatment. Thereafter, by using the bath C for treatment of Table 1, the cathodic electrolysis was repeated 4 times maintaining a distance between the electrodes of 30 mm, a current density of 4.5 A/dm$^2$ and passing the steel plate through a portion of the electrode length of 200 mm at a line speed of 40 m/min. Thereafter, the steel plate was washed with water and was dried to obtain a surface-treated steel plate.

2. Production of a Surface-Treated Steel Plate Having a Resin Coating.

The obtained surface-treated steel plate was heated in advance at a plate temperature of 250° C., a stretched film a of Table 2-2 was thermally press-adhered onto one surface of the metal plate that became the inner side of the can and a stretched film b of Table 2-2 was thermally press-adhered onto the other surface that became the outer side of the can, by using laminating rolls. Immediately thereafter, the surface-treated steel plate was cooled with water to obtain a surface-treated steel plate having a resin coating.

3. Production of Metal Cans.

The above surface-treated steel plate having the resin coating was electrostatically applied with a paraffin wax on both surfaces thereof, punched into circles of a diameter of 143 mm, drawn in a customary manner to form cups of a diameter of 91 mm and a height of 36 mm, and some of them were used for forming cans and the rest were used for evaluating the adhesion during the working. The draw-formed cups were, further, subjected to the simultaneous draw-ironing working two times to form cups having a small diameter and a large height. The thus obtained cups possessed properties as described below.

Diameter of cup: 52.0 mm
Height of cup: 111.7 mm
Thickness of can wall relative to
the initial plate thickness: −30%

After the doming, the cups were heat-treated at 220° C. for 60 seconds to remove strain in the resin film, followed by trimming the ends of the opening portions, printing on the curved surface, necking into a diameter of 50.8 mm and flanging to thereby obtain 200 g seamless cans.

4. Evaluating the Amounts of Films.

Some of the obtained surface-treated metal plates were used for measuring the amounts of films. The results were as shown in Table 10.

5. Evaluating the Close Adhesion During the Working.

The outer surface of the draw-formed cup was linearly incised at a portion 15 mm from the upper portion thereof, and the film was torn away in a direction of 180 degrees toward the height of the can by using a tension tester to measure the strength of adhesion in compliance with the above-mentioned method of evaluating the adhesiveness. Here, however, the test pieces were not retort-treated. After the test pieces were peeled by not less than 5 mm by using the tension tester, those having a maximum tensile strength of not less than 4 N/15 mm were regarded to be ○. The results were as shown in Table 10.

6. Evaluating the Close Adhesion of the Metal Cans after the Retort Treatment.

The inner surfaces of the flanged cans were incised to reach the base metal over the whole circumference at a portion 5 mm under the open end, and the cans in an empty state were held in the hot water vapor heated at 125° C. for 30 minutes to observe the peeled degrees of the coated resin near the incision in the inner surfaces of the cans. Those which were not peeled at all were regarded to be ○. The results were as shown in Table 10.

7. Evaluating the Wet Close Adhesion of the Metal Cans (Evaluating the Cross-Cut Corrosion Resistance of the Metal Cans).

By using a cutter, the inner surface of the obtained metal cans were cut in a crossing manner over a length of 4 cm in a manner that a position of a height of 55 mm of the can was at the center, and the adhesiveness was evaluated after one month has passed in compliance with the above method of evaluating the cross-cut corrosion resistance. The results were as shown in Table 10.

8. Evaluation of Cans after Filled with Contents (Pack Test (Dent Resistance)).

The obtained metal cans were filled with 185 ml of coffee (trade name: Blendy, bottled coffee, low sugar, produced by Ajinomoto General Foods, Inc.), wrap-seamed with a lid according to a customary method, and were retort-treated at 123° C. for 20 minutes. With the lids facing upward, the cans were stored at room temperature for one day. Thereafter, the cans were left to stand still being turned sideways, and a weight of 1 kg having spherical surface of a diameter of 52.0 mm was allowed to fall from a height of 40 mm so that the spherical surface hit the lower side wall of the can body to give impact to the can body to deform it. The cans were stored with the lids facing upward at 37° C. for 3 months. Thereafter, the wrap-seamed portions were cut by using a can opener to separate the lids from the can bodies. The deformed portions on the inner surfaces of the can bodies were observed for their corroded state by using a microscope and were evaluated. Fifty cans were examined and those that had not been corroded by blister were regarded to be ◯. The evaluated results were as shown in Table 10.

Example 97

The procedure was carried out in the same manner as in Example 96 but setting the current density to be 10 A/dm$^2$.

Example 98

The procedure was carried out in the same manner as in Example 96 but using the bath AA for treatment of Table 1.

Example 99

The procedure was carried out in the same manner as in Example 98 but setting the current density to be 10 A/dm$^2$.

Comparative Example 24

The cold-rolled steel plate having a thickness of 0.225 mm and a tempering degree of T3 was electrolytically dewaxed, washed with water, washed with acid, washed with water, was so treated that the amount of chromium was 130 mg/m$^2$ and the amount of chromium oxide hydrate was 20 mg/m$^2$ per one surface, and was, thereafter, washed with water and dried to obtain a surface-treated steel plate. Thereafter, the procedure was carried out in the same manner as in Example 96.

Example 100

1. Production of a Surface-Treated Steel Plate.

A cold-rolled steel plate having a thickness of 0.18 mm and a tempering degree of DR6 was dewaxed and washed with acid in a customary manner, and was plated with tin in a thickness of 2.8 g/m$^2$ on the surface that became the inner side of the can and, at the same time, with tin in a thickness of 1.3 g/m$^2$ on the surface that became the outer side of the can. The steel plate was then washed and was reflow-treated with tin. Next, by using the bath C of Table 1, the cathodic electrolysis was repeated 4 times maintaining a distance between the electrodes of 30 mm, a current density of 4.5 A/dm$^2$ and passing the steel plate through a portion of the electrode length of 200 mm at a line speed of 40 m/min. Thereafter, the steel plate was washed with water and was dried to obtain a surface-treated steel plate.

2. Production of a Surface-Treated Steel Plate Having a Resin Coating.

The obtained surface-treated steel plate was heated in advance at a plate temperature of 220° C., a cast film d of Table 2-2 was thermally press-adhered onto one surface of the metal plate that became the inner side of the can and a cast film e of Table 2-2 was thermally press-adhered onto the other surface that became the outer side of the can, by using laminating rolls. Immediately thereafter, the surface-treated steel plate was cooled with water to obtain a surface-treated metal plate having a resin coating.

3. Production of Metal Cans.

The above surface treated metal plate having the resin coating was electrostatically applied with a paraffin wax on both surfaces thereof, punched into circles of a diameter of 154 mm, drawn in a customary manner to form cups of a diameter of 95 mm and a height of 44 mm, and some of them were used for forming cans and the rest were used for evaluating the close adhesion during the working. The draw-formed cups were, further, subjected to the simultaneous draw-ironing working two times to form cups having a small diameter and a large height. The thus obtained cups possessed properties as described below.

Diameter of cup: 65.9 mm
Height of cup: 127.0 mm
Thickness of can wall relative to the initial plate thickness: −58%

After the doming, the cups were heat-treated at 220° C. for 60 seconds to remove strain in the resin film, followed by trimming the ends of the opening portions, printing on the curved surface, necking into a 206-diameter and flanging to thereby obtain 350 g seamless cans.

4. Evaluating the Amounts of Films.

Evaluated in the same manner as in Example 96. The results were as shown in Table 10.

5. Evaluating the Close Adhesion During the Working.

Evaluated in the same manner as in Example 96. Here, however, after the test pieces were peeled by not less than 5 mm by using the tension tester, those having a maximum tensile strength of not less than 1 N/15 mm were regarded to be ◯. The evaluated results were as shown in Table 10.

6. Evaluating the Close Adhesion of the Metal Cans after the Retort Treatment.

Evaluated in the same manner as in Example 96.

7. Evaluating the Cross-Cut Corrosion Resistance of the Metal Cans.

Evaluated in the same manner as in Example 96.

8. Evaluation of Cans after Filled with Contents (Pack Test (Dent Resistance)).

The obtained metal cans were filled with 350 ml of cider as a content (Mitsuya Cider (trademark)), and was wrap-seamed with a lid according to a customary method. With the lids facing upward, the cans were stored at 5° C. for one day. Thereafter, the cans were left to stand still being turned sideways, and a weight of 1 kg having a spherical surface of a diameter of 65.9 mm was allowed to fall from a height of 60 mm so that the spherical surface hit the lower side wall of the can body to give impact to the can body to deform it. The cans were stored with the lids facing upward at 37° C. for 6 months. Thereafter, the wrap-seamed portions were cut by using a can opener to separate the lids from the can bodies. The deformed portions on the inner surfaces of the can bodies were observed for their corroded state. The cans that had not been corroded by not less than 1 mm were regarded to be ◯. The evaluated results were as shown in Table 10.

9. Test of Spraying Brine onto the Flat Plates.

The obtained resin-coated metal plate was cut into a size of 80 mm wide and 130 mm long. Upon masking the end surfaces with a tape, brine of a concentration of 5% (NaCl=50 g/L) was sprayed thereon at a spraying temperature of 35° C. for 8 hours. The surface that became the inner side of the can was observed with visual observation for any corrosion after having been sprayed with brine. The plates on which no corrosion was observed were regarded to be ◯. The evaluated results were as shown in Table 10.

Example 101

The procedure was carried out in the same manner as in Example 100 but using the bath AA for treatment of Table 1 and setting the current density to be 6 A/dm².

Comparative Example 25

A cold-rolled steel plate having a thickness of 0.18 mm and a tempering degree of DR6 was plated with tin in a thickness of 2.8 g/m² on the surface that became the inner side of the can and, at the same time, with tin in a thickness of 1.3 g/dm² on the surface that became the outer side of the can in a customary manner, followed by washing and the reflow-treatment with tin. Next, the steel plate was treated in a customary manner so that the amount of chromium oxide hydrate was 5 mg/m² per one surface and was washed and dried to obtain a surface-treated steel plate. The steel plate was coated with the resin, and from which metal cans were produced and evaluated in the same manner as in Example 100.

Comparative Example 26

The procedure was carried out in the same manner as in Comparative Example 25 but executing the treatment in a manner that the amount of chromium was 10 mg/m² and the amount of chromium oxide hydrate was 15 mg/m² per one surface after the reflow-treatment with tin.

Example 102

1. Production of a Surface-Treated Steel Plate.

A cold-rolled steel plate having a thickness of 0.18 mm and a tempering degree of DR8 was plated with tin in a thickness of 0.8 g/m² on the surface that became the inner side of the can and in a thickness of 1.3 g/dm² on the surface that became the outer side of the can in a customary manner. The steel plate was then washed and was reflow-treated with tin. Next, by using the bath C for treatment of Table 1, the cathodic electrolysis was repeated 4 times maintaining a distance between the electrodes of 30 mm, a current density of 4.5 A/dm² and passing the steel plate through a portion of the electrode length of 200 mm at a line speed of 40 m/min. Thereafter, the steel plate was washed with water and was dried to obtain a surface-treated steel plate.

2. Production of a Steel Plate Having an Organic Resin Coating.

The obtained surface-treated steel plate was heated at 220° C., a cast film f of Table 2-2 was thermally press-adhered onto the surface that became the inner side of the can through the laminating rolls and was immediately cooled with water to obtain a surface-treated steel plate having a resin coating. Thereafter, the surface-treated steel plate was cut into a suitable size, coated with an epoxy acrylic aqueous coating material on the surface that became the outer surface of the can followed by baking at 180° C., drying, printing, baking at 180° C., application with a finishing varnish, baking at 185° C. and drying.

3. Production of Redrawn Cans.

The above surface treated steel plate having the organic resin coating on both surfaces was punched into circular blanks of a diameter of 160.0 mm. Thereafter, the blanks were drawn twice followed by paneling at the bottom, beading and trimming to form redrawn cans having an inner diameter of 74.1 mm, a height of 57.2 mm and a volume of 228 ml, which were heat-treated at 200° C. for 60 seconds.

4. Evaluating the Amount of the Film.

Some of the surface-treated metal plates were used for measuring the amount of the film. The results were as shown in Table 11.

5. Evaluation of Cans after Filled with Contents (Pack Test).

The obtained two-piece cans were filled with the content, double-wrap-seamed with an easy-to-open lid made of aluminum, and were retort-treated. The content was 190 g when it was salmon boiled in water and was 200 g when it was seasoned bonito. After wrap-seamed, the cans were retort-treated at 117° C. for 70 minutes.

Thereafter, the cans were left to stand still being turned sideways, and a weight of 1 kg having a spherical surface of a diameter of 74.1 mm was allowed to fall from a height of 40 mm at room temperature so that the spherical surface hit the lower side wall of the can body to give impact to the can body to deform it. The cans were stored with the lids facing upward at 37° C. for 6 months. Thereafter, the inner surfaces of the cans were observed with visual observation to evaluate the corroded state of the deformed portions, sulfurized and discolored state and peeling of film at the end of the cans.

Twenty cans were evaluated, and those that developed no discoloration, corrosion or floating of film were regarded to be ◯. Table 11 shows the results of evaluating the sulfurized and discolored state after having contained salmon boiled in water.

Example 103

The procedure was carried out in the same manner as in Example 102 but using the bath AA for treatment of Table 1.

Comparative Example 27

The procedure was carried out in the same manner as in Example 102 but executing the treatment according to a customary method in a manner that the amount of chromium oxide hydrate was 5 mg/m² per one surface after the reflow-treatment with tin.

Comparative Example 28

The procedure was carried out in the same manner as in Example 102 but executing the treatment according to a customary method in a manner that the amount of chromium was 10 mg/m² and the amount of chromium oxide hydrate was 15 mg/m² per one surface after the reflow-treatment with tin.

Example 104

The procedure was carried out in the same manner as in Example 102 but plating the surface that became the inner side of the can with tin in a thickness of 2.8 g/m² and setting the current density to be 6 A/dm².

Example 105

The procedure was carried out in the same manner as in Example 103 but plating the surface that became the inner side of the can with tin in a thickness of 2.8 g/m² and setting the current density to be 8 A/dm².

Comparative Example 29

The procedure was carried out in the same manner as in Comparative Example 27 but plating the surface that became the inner side of the can with tin in a thickness of 2.8 g/m².

Comparative Example 30

The procedure was carried out in the same manner as in Comparative Example 28 but plating the surface that became the inner side of the can with tin in a thickness of 2.8 g/m².

Example 106

1. Production of a Surface-Treated Steel Plate.

A cold-rolled steel plate having a thickness of 0.19 mm and a tempering degree of T4 was plated with tin of 1.3 g/m² on the surface that became the inner side of the can and of 2.8 g/dm² on the surface that became the outer side of the can in a customary manner. The steel plate was then reflow-treated with tin. Thereafter, by using the bath C for treatment of Table 1, the cathodic electrolysis was repeated 4 times maintaining a distance between the electrodes of 30 mm, a current density of 6 A/dm² and passing the steel plate through a portion of the electrode length of 200 mm at a line speed of 40 m/min. Thereafter, the steel plate was washed with water and was dried to obtain a surface-treated steel plate for producing cans.

Further, a cold-rolled steel plate having a thickness of 0.21 mm and a tempering degree of T4 was treated in the same manner as described above inclusive of being plated with tin, and was used as a steel plate for producing can lids.

2. Production of a Steel Plate Having an Organic Resin Coating for Producing Cans.

The surface-treated steel plate was cut into a size of 1035 mm×880 mm. Thereafter, the steel plate was marginally coated on the inner surface side thereof with an epoxy acrylic aqueous coating material so that the coated film material after baked was 5 µm wherein margins of approximately 1.5 mm from the seamed portion of the can body were excepted from coating, and was baked and cured in a hot-air drying furnace heated at 200° C. for 10 minutes. Next, the outer side of the steel plate was marginally coated with a white coating such that the film thickness after baked was 5 µm, was baked and cured in the hot-air drying furnace heated at 190° C. for 10 minutes, was printed, was applied with a finishing varnish, and was dried at 190° C. for 10 minutes to obtain a resin-coated metal plate.

3. Production of Welded Cans.

The resin-coated metal plate that was produced was cut into a blank of a size of 73 mm×206 mm with the marginal portions as both ends. The blank was then rounded, and the end portions thereof were spared for overlapping widths of 0.3 mm or 1.5 mm, and were welded together by using a commercially available electric resistance welding machine that uses a copper wire electrode. Next, the inner and outer surfaces of the seamed portion of the can body welded over the overlapping width of 0.3 mm were spray-coated with a solvent-type epoxy phenol repairing coating material such that the film thickness after dried was 40 µm followed by baking in the hot-air drying furnace heated at 200° C. for 30 seconds to repair the seamed portion by coating. Thereafter, three beads of a convex depth of 0.5 mm were formed at a central portion on the inner surface of the can body, and one end of the can was necked to assume a diameter of 64.3 mm, was flanged, and wrapped-seamed with a commercially available aluminum easy-to-open lid to thereby produce a welded can.

4. Production of can Lids.

The steel plate for producing can lids was roll-coated on both surfaces thereof with an epoxy acrylic aqueous coating material such that the film thickness after baking was 10 microns, baked at 200° C. for 10 minutes, and from which a steel lid of a diameter of 68.3 mm was produced in a customary manner.

5. Evaluating the Amount of the Film.

Some of the surface-treated metal plates were used for measuring the amount of the film. The results were as shown in Table 12.

6. Evaluation of Cans after Filled with Contents (Pack Test).

The obtained welded empty cans were filled with seasoned bonito and boiled adzuki bean, wrap-seamed with the produced steel lid, and were retort-treated.

The seasoned bonito had its meat filled in an amount of 185 g while the boiled adzuki beans had its beans filled in an amount of 210 g, and were retort-treated at 117° C. for 70 minutes.

The canned seasoned bonito and the canned boiled adzuki beans were stored in a thermostatic chamber maintained at 37° C. for one year. Thereafter, the cans were opened, and the inner surfaces of the can bodies (ISS portions which were the inner surfaces of the weld-seamed portions, pressure-ridge portions, body hook radius portions) and the steel lid portions were observed with visual observation for any corrosion or floating of film. The evaluated results were as shown in Table 12.

Example 107

The surface-treated steel plate, resin-coated steel plate (metal plate), welded can and can lid were produced and evaluated in the same manner as in Example 106 but using the bath AA for treatment of Table 1 and setting the current density to 8 A/dm².

Comparative Example 31

The procedure was carried out in the same manner as in Example 106 but executing the treatment in such a manner that the amount of chromium was 10 mg/m² and the amount of chromium oxide hydrate was 15 mg/m² per one surface after the reflow-treatment with tin.

Comparative Example 32

The procedure was carried out in the same manner as in Example 106 but executing the treatment in such a manner that the amount of chromium oxide hydrate was 5 mg/m² per one surface after the reflow-treatment with tin.

From the above results of evaluation, it was learned that Examples 106 and 107 maintained properties of a level equivalent to that of Comparative Examples 31 and 32 which have executed the surface treatment with chromium.

TABLE 1

| Bath | Polycarboxylic acid | pH | Zr conc. ppm | Ti conc. ppm | PC conc. ppm | PC/(Zr + Ti) |
|---|---|---|---|---|---|---|
| A | polyitaconic acid | 2.5 | 1000 | 0 | 100 | 0.10 |
| B | polyitaconic acid | 2.5 | 2000 | 0 | 200 | 0.10 |
| C | polyitaconic acid | 2.5 | 5000 | 0 | 500 | 0.10 |
| D | polyitaconic acid | 3.0 | 5000 | 0 | 500 | 0.10 |
| E | polyitaconic acid | 3.5 | 5000 | 0 | 500 | 0.10 |
| F | polyitaconic acid | 4.0 | 5000 | 0 | 500 | 0.10 |
| G | polyitaconic acid | 2.5 | 6000 | 0 | 600 | 0.10 |
| H | polyitaconic acid | 2.5 | 8000 | 0 | 800 | 0.10 |
| I | polyitaconic acid | 2.5 | 10000 | 0 | 1000 | 0.10 |
| J | none | 2.5 | 5000 | 0 | 0 | 0.00 |
| K | polyitaconic acid | 2.5 | 5000 | 0 | 100 | 0.02 |
| L | polyitaconic acid | 2.5 | 5000 | 0 | 250 | 0.05 |
| M | polyitaconic acid | 2.5 | 1000 | 0 | 200 | 0.20 |
| N | polyitaconic acid | 2.5 | 2000 | 0 | 400 | 0.20 |
| O | polyitaconic acid | 2.5 | 5000 | 0 | 1000 | 0.20 |
| P | polyitaconic acid | 2.5 | 1000 | 0 | 800 | 0.80 |
| AA | polyitaconic acid | 2.5 | 0 | 4000 | 800 | 0.20 |
| AB | polyitaconic acid | 2.5 | 2500 | 2500 | 600 | 0.12 |
| AC | polyitaconic acid | 2.5 | 0 | 1200 | 120 | 0.10 |

TABLE 1-continued

| Bath | Polycarboxylic acid | pH | Zr conc. ppm | Ti conc. ppm | PC conc. ppm | PC/(Zr + Ti) |
|---|---|---|---|---|---|---|
| BA | none | 2.5 | 0 | 4000 | 0 | 0.00 |
| BB | none | 2.5 | 2500 | 2500 | 0 | 0.00 |
| BC | none | 2.5 | 0 | 1200 | 0 | 0.00 |
| CA | polyacrylic acid | 2.5 | 5500 | 0 | 500 | 0.09 |

TABLE 2-1

| | Polyester component | | | |
|---|---|---|---|---|
| | Copolymerizable component | Copolymerizing ratio mol % | Content wt % | Ionomer Content wt % | Tocopherol Content wt % |
| A | isophthalic acid | 11 | 100 | 0 | 0 |
| B | isophthalic acid | 12 | 100 | 0 | 0 |
| C | isophthalic acid | 15 | 100 | 0 | 0 |
| D | isophthalic acid | 5 | 100 | 0 | 0 |
| E | isophthalic acid | 15 | 81 | 18 | 1 |
| F | isophthalic acid | 2 | 100 | 0 | 0 |

TABLE 2-2

| | Surface layer | | Core layer | | Lower layer | | |
|---|---|---|---|---|---|---|---|
| | Resin composition | Thickness μm | Resin composition | Thickness μm | Resin composition | Thickness μm | Kind of film |
| a | A | 19 | — | — | — | — | stretched |
| b | B | 13 | — | — | — | — | white/stretched |
| c | D | 4 | — | — | C | 16 | cast |
| d | D | 5 | — | — | E | 23 | cast |
| e | B | 2 | D | 12 | C | 2 | white/cast |
| f | F | 3 | — | — | E | 17 | cast |

TABLE 3

| | Bath | Initial pH | Fe conc. ppm | Sn conc. ppm | pH after adjusted | Precipitate Height mm | PC ppm | Fe ppm | Sn ppm |
|---|---|---|---|---|---|---|---|---|---|
| Ex. 1 | K | 2.5 | 200 | 0 | 3.0 | 1 | 0 | 4 | — |
| Ex. 2 | L | 2.5 | 200 | 0 | 3.0 | 1 | 135 | 9 | — |
| Ex. 3 | C | 2.5 | 200 | 0 | 3.0 | 1 | 294 | 21 | — |
| Ex. 4 | O | 2.5 | 200 | 0 | 3.0 | 3 | 636 | 16 | — |
| Ex. 5 | K | 2.5 | 200 | 0 | 3.5 | 3 | 42 | 31 | — |
| Ex. 6 | L | 2.5 | 200 | 0 | 3.5 | 8 | 150 | 35 | — |
| Ex. 7 | C | 2.5 | 200 | 0 | 3.5 | 10 | 299 | 40 | — |
| Ex. 8 | O | 2.5 | 200 | 0 | 3.5 | 13 | 668 | 39 | — |
| Ex. 9 | AA | 2.5 | 200 | 0 | 3.5 | 11 | 441 | 42 | — |
| Ex. 10 | AB | 2.5 | 200 | 0 | 3.5 | 10 | 388 | 37 | — |
| Ex. 11 | K | 2.5 | 800 | 0 | 2.5 | 1 | 55 | 55 | — |
| Ex. 12 | L | 2.5 | 800 | 0 | 2.5 | 3 | 135 | 78 | — |
| Ex. 13 | C | 2.5 | 800 | 0 | 2.5 | 5 | 272 | 83 | — |
| Ex. 14 | O | 2.5 | 800 | 0 | 2.5 | 10 | 583 | 87 | — |
| Ex. 15 | AA | 2.5 | 800 | 0 | 2.5 | 8 | 409 | 136 | — |
| Ex. 16 | AB | 2.5 | 800 | 0 | 2.5 | 8 | 307 | 122 | — |
| Ex. 17 | CA | 2.5 | 600 | 0 | 2.5 | 15 | 300 | 75 | — |
| Ex. 18 | C | 2.5 | 0 | 1200 | 2.5 | 4 | 285 | — | 650 |
| Ex. 19 | C | 2.5 | 0 | 600 | 3.0 | 8 | 293 | — | 170 |
| Comp. Ex. 1 | J | 2.5 | 200 | 0 | 3.0 | 0 | 0 | 0 | — |
| Comp. Ex. 2 | J | 2.5 | 200 | 0 | 3.5 | 2 | 0 | 33 | — |
| Comp. Ex. 3 | BA | 2.5 | 200 | 0 | 3.5 | 0 | 0 | 0 | — |
| Comp. Ex. 4 | BB | 2.5 | 200 | 0 | 3.5 | 1 | 0 | 16 | — |
| Comp. Ex. 5 | J | 2.5 | 800 | 0 | 2.5 | 0 | 0 | 0 | — |

TABLE 3-continued

|  | Bath | Initial pH | Fe conc. ppm | Sn conc. ppm | pH after adjusted | Precipitate Height mm | PC ppm | Fe ppm | Sn ppm |
|---|---|---|---|---|---|---|---|---|---|
| Comp. Ex. 6 | BA | 2.5 | 800 | 0 | 2.5 | 0 | 0 | 0 | — |
| Comp. Ex. 7 | BB | 2.5 | 800 | 0 | 2.5 | 0 | 0 | 0 | — |
| Comp. Ex. 8 | J | 2.5 | 0 | 1200 | 2.5 | 0 | 0 | — | 0 |
| Comp. Ex. 9 | J | 2.5 | 0 | 600 | 3.0 | 0 | 0 | — | 0 |

TABLE 4

|  | Bath | pH | Zr conc. ppm | PC conc. ppm | PC/Zr | Fe conc. ppm | Film Zr amount $mg/m^2$ | C amount $mg/m^2$ | Cross-cut corrosion resistance |
|---|---|---|---|---|---|---|---|---|---|
| Ex. 20 | C | 2.5 | 5000 | 500 | 0.10 | 0 | 33-54 | 1.0-1.3 | 4.8 |
| Ex. 21 | C | 2.5 | 5000 | 500 | 0.10 | 200 | 27-54 | 0.8-1.0 | 4.5 |
| Ex. 22 | C | 2.5 | 5000 | 500 | 0.10 | 400 | 23-50 | 0.6-0.8 | 4.2 |
| Ex. 23 | C | 2.5 | 5000 | 500 | 0.10 | 600 | 25-56 | 0.7-0.9 | 3.3 |
| Ex. 24 | L | 2.5 | 5000 | 250 | 0.05 | 0 | 29-52 | 0.5-0.9 | 5.0 |
| Ex. 25 | L | 2.5 | 5000 | 250 | 0.05 | 200 | 26-57 | 0.3-0.8 | 5.0 |
| Ex. 26 | L | 2.5 | 5000 | 250 | 0.05 | 400 | 29-56 | 0.5-0.7 | 5.0 |
| Ex. 27 | L | 2.5 | 5000 | 250 | 0.05 | 600 | 37-59 | 0.5-1.0 | 4.8 |
| Ex. 28 | O | 2.5 | 5000 | 1000 | 0.20 | 0 | 13-44 | 1.9-2.9 | 4.8 |
| Ex. 29 | O | 2.5 | 5000 | 1000 | 0.20 | 200 | 17-48 | 0.8-1.7 | 5.0 |
| Ex. 30 | O | 2.5 | 5000 | 1000 | 0.20 | 400 | 21-48 | 0.8-1.5 | 5.0 |
| Ex. 31 | O | 2.5 | 5000 | 1000 | 0.20 | 600 | 21-50 | 0.8-1.1 | 4.8 |
| Ex. 32 | K | 2.5 | 5000 | 100 | 0.02 | 0 | 26-57 | 0.5-0.8 | 4.8 |
| Ex. 33 | K | 2.5 | 5000 | 100 | 0.02 | 200 | 28-57 | 0.4-0.7 | 4.7 |
| Ex. 34 | K | 2.5 | 5000 | 100 | 0.02 | 400 | 38-63 | 0.5-0.7 | 5.0 |
| Ex. 35 | K | 2.5 | 5000 | 100 | 0.02 | 600 | 29-75 | 0.3-0.8 | 5.0 |
| Ex. 36 | A | 2.5 | 1000 | 100 | 0.10 | 0 | 18-31 | 1.1-2.0 | 5.0 |
| Ex. 37 | A | 2.5 | 1000 | 100 | 0.10 | 200 | 29-53 | 1.1-1.5 | 5.0 |
| Ex. 38 | A | 2.5 | 1000 | 100 | 0.10 | 400 | 34-54 | 1.2-1.8 | 5.0 |
| Ex. 39 | A | 2.5 | 1000 | 100 | 0.10 | 600 | 30-44 | 1.1-2.1 | 3.6 |
| Ex. 40 | B | 2.5 | 2000 | 200 | 0.10 | 0 | 25-58 | 1.4-1.9 | 5.0 |
| Ex. 41 | B | 2.5 | 2000 | 200 | 0.10 | 200 | 28-68 | 1.3-1.6 | 5.0 |
| Ex. 42 | B | 2.5 | 2000 | 200 | 0.10 | 400 | 26-75 | 1.1-1.6 | 4.0 |
| Ex. 43 | B | 2.5 | 2000 | 200 | 0.10 | 600 | 36-84 | 1.1-1.4 | 3.7 |
| Ex. 44 | G | 2.5 | 6000 | 600 | 0.10 | 0 | 20-49 | 1.4-2.5 | 5.0 |
| Ex. 45 | G | 2.5 | 6000 | 600 | 0.10 | 200 | 19-48 | 1.2-1.4 | 5.0 |
| Ex. 46 | G | 2.5 | 6000 | 600 | 0.10 | 400 | 20-51 | 1.1-1.5 | 4.8 |
| Ex. 47 | G | 2.5 | 6000 | 600 | 0.10 | 600 | 29-54 | 1.4-3.1 | 3.2 |
| Ex. 48 | H | 2.5 | 8000 | 800 | 0.10 | 0 | 20-43 | 2.1-3.7 | 4.1 |
| Ex. 49 | H | 2.5 | 8000 | 800 | 0.10 | 200 | 13-42 | 1.1-1.6 | 5.0 |
| Ex. 50 | H | 2.5 | 8000 | 800 | 0.10 | 400 | 14-41 | 1.1-1.5 | 5.0 |
| Ex. 51 | H | 2.5 | 8000 | 800 | 0.10 | 600 | 16-42 | 1.2-1.7 | 4.5 |
| Ex. 52 | CA | 2.5 | 5500 | 500 | 0.09 | 0 | 20-60 | 3.3-4.3 | 3.4 |
| Ex. 53 | CA | 2.5 | 5500 | 500 | 0.09 | 300 | 23-64 | 2.1-2.3 | 3.6 |
| Comp. Ex. 10 | J | 2.5 | 5000 | 0 | 0.00 | 0 | 40-65 | 0.0 | 2.7 |
| Comp. Ex. 11 | J | 2.5 | 5000 | 0 | 0.00 | 200 | 30-64 | 0.0 | 2.7 |
| Comp. Ex. 12 | J | 2.5 | 5000 | 0 | 0.00 | 400 | 32-69 | 0.0 | 2.3 |
| Comp. Ex. 13 | J | 2.5 | 5000 | 0 | 0.00 | 600 | 32-67 | 0.0 | 2.0 |

TABLE 5

|  | Bath | pH | Zr conc. ppm | PC conc. ppm | PC/Zr | Electrolytically treated | Electric conductivity S/cm | Voltage with 10 A/$dm^2$ | Rate of Zr deposition mg/$m^2$/sec |
|---|---|---|---|---|---|---|---|---|---|
| Ex. 54 | C | 2.5 | 5000 | 500 | 0.10 | yes | 16.4 | 10.0 | 122 |
| Ex. 55 | D | 3.0 | 5000 | 500 | 0.10 | yes | 16.5 | — | 119 |
| Ex. 56 | E | 3.5 | 5000 | 500 | 0.10 | yes | 16.0 | — | 146 |
| Ex. 57 | F | 4.0 | 5000 | 500 | 0.10 | yes | 16.0 | — | 125 |
| Ex. 58 | G | 2.5 | 6000 | 600 | 0.10 | yes | 21.2 | — | 131 |
| Ex. 59 | H | 2.5 | 8000 | 800 | 0.10 | yes | 26.6 | — | 118 |
| Ex. 60 | L | 2.5 | 5000 | 250 | 0.05 | yes | 17.4 | — | 98 |

TABLE 5-continued

|  | Bath | pH | Zr conc. ppm | PC conc. ppm | PC/Zr | Electrolytically treated | Electric conductivity S/cm | Voltage with 10 A/dm² | Rate of Zr deposition mg/m²/sec |
|---|---|---|---|---|---|---|---|---|---|
| Ex. 61 | K | 2.5 | 5000 | 100 | 0.02 | yes | 17.6 | — | 93 |
| Ex. 62 | O | 2.5 | 5000 | 1000 | 0.20 | yes | 13.2 | 11.7 | 111 |
| Ex. 63 | I | 2.5 | 10000 | 1000 | 0.10 | yes | 34.6 | — | 108 |
| Ex. 64 | A | 2.5 | 1000 | 100 | 0.10 | yes | 3.9 | 34.7 | 47 |
| Ex. 65 | B | 2.5 | 2000 | 200 | 0.10 | yes | 11.0 | 15.5 | 56 |
| Comp. Ex. 14 | C | 2.5 | 5000 | 500 | 0.10 | no | 16.4 | — | 1.8 |
| Comp. Ex. 15 | L | 2.5 | 5000 | 250 | 0.05 | no | 17.4 | — | 2.6 |
| Comp. Ex. 16 | H | 2.5 | 8000 | 800 | 0.10 | no | 26.6 | — | 1.8 |

TABLE 6

|  | State of bath | pH | Zr ppm | PC ppm | Fe ppm | Cross-cut resistance |
|---|---|---|---|---|---|---|
| Ex. 66 | precipitate not removed | 2.5 | 5050 | 566 | 618 | 3.2 |
| Ex. 67 | precipitate removed | 2.5 | 5083 | 226 | 433 | 4.3 |

TABLE 7

|  | Bath | Sn plating amount g/m² | Zr amount mg/m² | C amount mg/m² | Strength of adhesion N/15 mm |
|---|---|---|---|---|---|
| Ex. 68 | D | 2.8 | 20 | 1.1 | 6.5 |
| Ex. 69 | SA | 2.8 | 23 | 1.2 | 5.4 |
| Ex. 70 | SB | 2.8 | 26 | 1.2 | 3.2 |
| Comp. Ex. 17 | J | 2.8 | 18 | 0.0 | 2.3 |
| Comp. Ex. 18 | chromate bath | 2.8 | 0 | 0.0 | 4.5 |

TABLE 8

|  | Bath | Electrolytically treated *1 | Current density A/dm² | Dipping time *2 sec. | Zr or Ti amount mg/m² | C amount mg/m² | Fe/Zr Surface | Fe/Zr Center | Cross-cut resistance |
|---|---|---|---|---|---|---|---|---|---|
| Ex. 71 | A | yes | 4 | 4 | 0 | 23.5 | 0.4 | — | — | 5 |
| Ex. 72 | M | yes | 4 | 4 | 0 | 33.9 | 1.3 | — | — | 4 |
| Ex. 73 | B | yes | 4 | 4 | 0 | 37.3 | 1.0 | — | — | 5 |
| Ex. 74 | N | yes | 4 | 8 | 0 | 47.3 | 3.2 | — | — | 5 |
| Ex. 75 | K | yes | 4 | 4 | 0 | 52.8 | 0.6 | — | — | 5 |
| Ex. 76 | L | yes | 4 | 4 | 0 | 45.0 | 0.5 | — | — | 5 |
| Ex. 77 | C | yes | 10 | 1 | 0 | 20.6 | 1.2 | 0.7 | 0.5 | 4 |
| Ex. 78 | C | yes | 10 | 13 | 0 | 162 | 2.8 | — | — | 5 |
| Ex. 79 | C | yes | 10 | 24 | 0 | 272 | 3.1 | — | — | 5 |
| Ex. 80 | C | yes | 6 | 4 | 0 | 45.0 | 1.0 | 0.5 | 0.5 | 4 |
| Ex. 81 | C | yes | 6 | 10 | 0 | 91.7 | 1.2 | 0.2 | 0.4 | 5 |
| Ex. 82 | C | yes | 6 | 22 | 0 | 170 | 4.5 | 0.3 | 0.2 | 4 |
| Ex. 83 | O | yes | 4 | 4 | 0 | 20.0 | 2.9 | — | — | 4 |
| Ex. 84 | D | yes | 4 | 4 | 0 | 66.3 | 1.7 | — | — | 5 |
| Ex. 85 | E | yes | 4 | 4 | 0 | 69.4 | 2.1 | — | — | 5 |
| Ex. 86 | F | yes | 4 | 4 | 0 | 68.7 | 1.9 | — | — | 5 |
| Ex. 87 | I | yes | 4 | 4 | 0 | 38.7 | 1.7 | — | — | 4 |
| Ex. 88 | AC | yes | 1 | 12 | 0 | 35.0 | 1.0 | — | — | 5 |
| Ex. 89 | C | yes | 6 | 4 | 0 | 25.0 | 0.2 | 2.5 | 1.0 | 3 |
| Ex. 90 | P | yes | 4 | 4 | 0 | 22.0 | 5.0 | — | — | 3 |
| Ex. 91 | C | yes | 4 | 30 | 0 | 295 | 3.3 | — | — | 4 |
| Ex. 92 | O | yes | 4 | 4 | 0 | 3.0 | 1.8 | — | — | 3 |
| Comp. Ex. 19 | J | yes | 6 | 4 | 0 | 55.9 | 0.0 | 0.8 | 0.7 | 2 |
| Comp. Ex. 20 | J | yes | 6 | 4 | 0 | 49.5 | 0.0 | 2.0 | 1.0 | 2 |
| Comp. Ex. 21 | C | no | 0 | 0 | 20 | 22.0 | 2.1 | 1.4 | 1.2 | 0 |
| Comp. Ex. 22 | BC | yes | 1 | 12 | 0 | 32.0 | 0.0 | — | — | 2 |
| Comp. Ex. 23 | TFS | yes | — | — | 0 | 0 | 0 | — | — | 5(with Cr) |

*1: Electrolytically treated,
*2: Repeated number

TABLE 9

| | Pre-plating | Electrolytic condition Bath | Current density A/dm² | *1 | Film Zr amount mg/m² | C amount mg/m² | (Fe and Sn)/Zr Surface | (Fe and Sn)/Zr Center | Cross-cut resistance | Strength of adhesion N/15 mm |
|---|---|---|---|---|---|---|---|---|---|---|
| Ex. 93 | tin | D | 4 | 2 | 21.0 | 1.2 | 0.3 | 0.85 | 5 | 5.2 |
| Ex. 94 | tin | D | 4 | 12 | 45.0 | 1.0 | — | — | 5 | 5.8 |
| Ex. 95 | tin | D | 2 | 1 | 3.0 | 0.3 | — | — | 4 | 3.3 |

*1: Repeated number

TABLE 10

| | Film evaluated | | | | | Can property evaluated | | | *4 | | | Overall evaluation |
|---|---|---|---|---|---|---|---|---|---|---|---|---|
| | Sn amount g/m² | Zr amount mg/m² | Ti amount mg/m² | C amount mg/m² | Cr amount mg/m² | *1 | *2 | *3 | *5 | *6 | *7 | |
| Ex. 96 | 0.0 | 30 | 0 | 2.7 | 0 | ○ | ○ | 5 | ○ | — | — | ○ |
| Ex. 97 | 0.0 | 100 | 0 | 3.5 | 0 | ○ | ○ | 5 | ○ | — | — | ○ |
| Ex. 98 | 0.0 | 0 | 27 | 3.1 | 0 | ○ | ○ | 5 | ○ | — | — | ○ |
| Ex. 99 | 0.0 | 0 | 72 | 3.7 | 0 | ○ | ○ | 5 | ○ | — | — | ○ |
| Ex. 100 | 2.8 | 25 | 0 | 0.8 | 0 | ○ | ○ | 5 | — | ○ | ○ | ○ |
| Ex. 101 | 2.8 | 0 | 23 | 0.7 | 0 | ○ | ○ | 5 | — | ○ | ○ | ○ |
| Comp. Ex. 24 | 0.0 | 0 | 0 | 0.0 | 130 | ○ | ○ | 5 | ○ | — | — | ○(with Cr) |
| Comp. Ex. 25 | 2.8 | 0 | 0 | 0.0 | 4.5 | ○ | ○ | 5 | — | ○ | ○ | ○(with Cr) |
| Comp. Ex. 26 | 2.8 | 0 | 0 | 0.0 | 28 | ○ | ○ | 5 | — | ○ | ○ | ○(with Cr) |

*1: Adhesion after the working N/15 mm
*2: Adhesion after the retort treatment
*3: Cross-cut resistance
*4: Evaluation of cans after filled with contents
*5: Black coffee
*6: Cider
*7: Brine sprayed onto plate

TABLE 11

| | Film evaluated | | | | | Evaluation of cans after filled with contents | |
|---|---|---|---|---|---|---|---|
| | Sn amount g/m² | Zr amount mg/m² | Ti amount mg/m² | C amount mg/m² | Cr amount mg/m² | Salmon boiled in water | Seasoned bonito |
| Ex. 102 | 0.8 | 30 | 0 | 2.6 | 0 | ○ | — |
| Ex. 103 | 0.8 | 0 | 28 | 0.9 | 0 | ○ | — |
| Ex. 104 | 2.8 | 29 | 0 | 2.5 | 0 | — | ○ |
| Ex. 105 | 2.8 | 0 | 29 | 1.0 | 0 | — | ○ |
| Comp. Ex. 27 | 0.8 | 0 | 0 | 0.0 | 5 | ○(with Cr) | — |
| Comp. Ex. 28 | 0.8 | 0 | 0 | 0.0 | 25 | ○(with Cr) | — |
| Comp. Ex. 29 | 2.8 | 0 | 0 | 0.0 | 5 | — | ○(with Cr) |
| Comp. Ex. 30 | 2.8 | 0 | 0 | 0.0 | 25 | — | ○(with Cr) |

TABLE 12

| Part | Film evaluated | | | | | Evaluation of cans after filled with contents | |
|---|---|---|---|---|---|---|---|
| | Sn amount g/m² | Zr amount mg/m² | Ti amount mg/m² | C amount mg/m² | Cr amount mg/m² | Boiled adzuki bean | Seasoned bonito |
| Ex. 106 | | | | | | | |
| can body | 1.3 | 35 | 0 | 2.8 | 0 | no problem | no problem |
| can lid | 1.3 | 35 | 0 | 2.7 | 0 | no problem | no problem |

TABLE 12-continued

| | Film evaluated | | | | | Evaluation of cans after filled with contents | |
|---|---|---|---|---|---|---|---|
| | Sn | Zr | Ti | C | Cr | | |
| Part | amount g/m² | amount mg/m² | amount mg/m² | amount mg/m² | amount mg/m² | Boiled adzuki bean | Seasoned bonito |
| Ex. 107 | | | | | | | |
| can body | 1.3 | 0 | 27 | 3.2 | 0 | no problem | no problem |
| can lid | 1.3 | 0 | 28 | 3.3 | 0 | no problem | no problem |
| Comp. Ex. 31 | | | | | | | |
| can body | 1.3 | 0 | 0 | 0 | 25 | *1 | *1 |
| can lid | 1.3 | 0 | 0 | 0 | 25 | *1 | *1 |
| Comp. Ex. 32 | | | | | | | |
| can body | 2.8 | 0 | 0 | 0 | 5 | *2 | *3 |
| can lid | 2.8 | 0 | 0 | 0 | 5 | *1 | *1 |

*1: no problem (with Cr)
*2: pressure-ridge portion corroded, overlapped portion corroded (with Cr)
*3: pressure-ridge portion corroded, blistered (with Cr)

INDUSTRIAL APPLICABILITY

With the polycarboxylic acid being contained in the bath for surface treatment of the invention, Fe ions eluted out in the bath from the steel plate (as well as Sn ions if the steel plate has a tin-plated layer) are trapped by the polycarboxylic acid, and the concentration of Fe ions in the bath (inclusive of Sn ions if the steel plate has the tin-plated layer) is maintained to be not larger than a predetermined value making it possible to forma film having excellent corrosion resistance and to carry out the high-speed treatment maintaining a rate of deposition of Zr and/or Ti per a second of current flowing time of not less than 80 mg/m²/sec. It is thus made possible to produce a surface-treated steel plate and, specifically, a surface-treated steel plate having an organic coating for producing cans excellent in corrosion resistance and adhesiveness to the coating maintaining good productivity.

Further, the bath for surface treatment and the surface-treated steel plate having the organic coating produced by using the bath for surface treatment feature excellent adhesion to the coating during the working. Therefore, the surface-treated steel plate of the invention can be favorably used for producing seamless cans that are obtained through the conventional working, i.e., bend-elongation working (stretch working) based on the draw•redrawing, bend-elongation•ironing working based on the draw•redrawing, or draw•ironing working which is high degree of working.

Owing to their excellent corrosion resistance, close adhesion after the retorting and dent resistance, further, the can bodies and can lids of the present invention can be favorably used as containers for containing strongly corrosive contents and contents that require retort-sterilization.

The invention claimed is:

1. A method of producing a surface-treated steel plate which comprises forming a surface-treating film on a steel plate by cathodic electrolysis in a bath for surface treatment containing Zr and/or Ti, and a polycarboxylic acid, wherein the polycarboxylic acid comprises polyitaconic acid, a concentration of Fe ions in said bath for surface treatment is adjusted to be not more than 500 ppm, and a rate of deposition of Zr and/or Ti per a second of current flowing time is not less than 80 mg/m²/sec.

2. The method of producing a surface-treated steel plate as claimed in claim 1, wherein a pH of a treating solution in said bath for surface treatment is elevated to precipitate and remove an iron polycarboxylate therefrom followed by returning the pH back and, thereafter, the polycarboxylic acid is added so that the concentration of the polycarboxylic acid in the bath for surface treatment lies in a range of from 0.01 to 1.0 times as great as the concentration of Zr and/or Ti.

3. The method of producing a surface-treated steel plate as claimed in claim 2, wherein a tin-plated layer is formed on the surface of said steel plate, the surface-treating film is formed on the tin-plated layer, and said precipitate further includes a tin polycarboxylate.

4. The method of producing a surface-treated steel plate as claimed in claim 3, wherein a total concentration of Sn ions and Fe ions in the bath for surface treatment is adjusted to be not more than 500 ppm.

* * * * *